United States Patent [19]
Pollak

[11] Patent Number: 6,106,298
[45] Date of Patent: Aug. 22, 2000

[54] RECONFIGURABLE EASILY DEPLOYABLE SIMULATOR

[75] Inventor: Eytan Pollak, Oviedo, Fla.

[73] Assignee: Lockheed Martin Corporation, Orlando, Fla.

[21] Appl. No.: 08/837,118

[22] Filed: Apr. 14, 1997

Related U.S. Application Data

[63] Continuation-in-part of application No. 08/738,821, Oct. 28, 1996, abandoned.

[51] Int. Cl.$^7$ ..................................................... G09B 9/00
[52] U.S. Cl. .................................. 434/29; 434/30; 434/55
[58] Field of Search .................................. 434/29, 30, 35, 434/37, 38, 45, 64–69, 58, 55, 43

[56] References Cited

U.S. PATENT DOCUMENTS

| | | | |
|---|---|---|---|
| 5,286,202 | 2/1994 | De Gyarfas et al. | 434/29 |
| 5,490,783 | 2/1996 | Stephens et al. | |
| 5,509,806 | 4/1996 | Ellsworth . | |
| 5,888,069 | 3/1999 | Romanoff et al. | 434/33 |
| 5,953,519 | 9/1999 | Fura | 395/500.19 |

FOREIGN PATENT DOCUMENTS

| | | |
|---|---|---|
| 0 368 458 A1 | 5/1990 | European Pat. Off. . |
| 0 476 920 A1 | 3/1992 | European Pat. Off. . |
| 0 483 991 A2 | 5/1992 | European Pat. Off. . |
| 0 483 992 A2 | 5/1992 | European Pat. Off. . |
| 0 483 992 A3 | 5/1992 | European Pat. Off. . |
| WO 97/00106 | 1/1997 | WIPO . |

OTHER PUBLICATIONS

European Search Report.

Pp. 1–1 through 1–42 of the System Design of a Proposal to develop a simulator which was submitted to the U.S. Government on or about Jun. 19, 1995.

*Primary Examiner*—Jessica J. Harrison
*Assistant Examiner*—Sheila Clayton
*Attorney, Agent, or Firm*—Rockey, Milnamow & Katz, Ltd.

[57] ABSTRACT

A modular, reconfigurable and easily deployable simulator system includes a plurality of vehicle personality kits and at least one frame to support a single crewstation. Members of a selected kit are coupled to the frame. A multi-platform control system provides on-the-window and in vehicle instrument displays in real-time in response to the crewperson manipulating platform controls. An editor with a graphical user interface provides a capability to modify program segments of the control system thereby altering the behavior of the simulated platform.

48 Claims, 18 Drawing Sheets

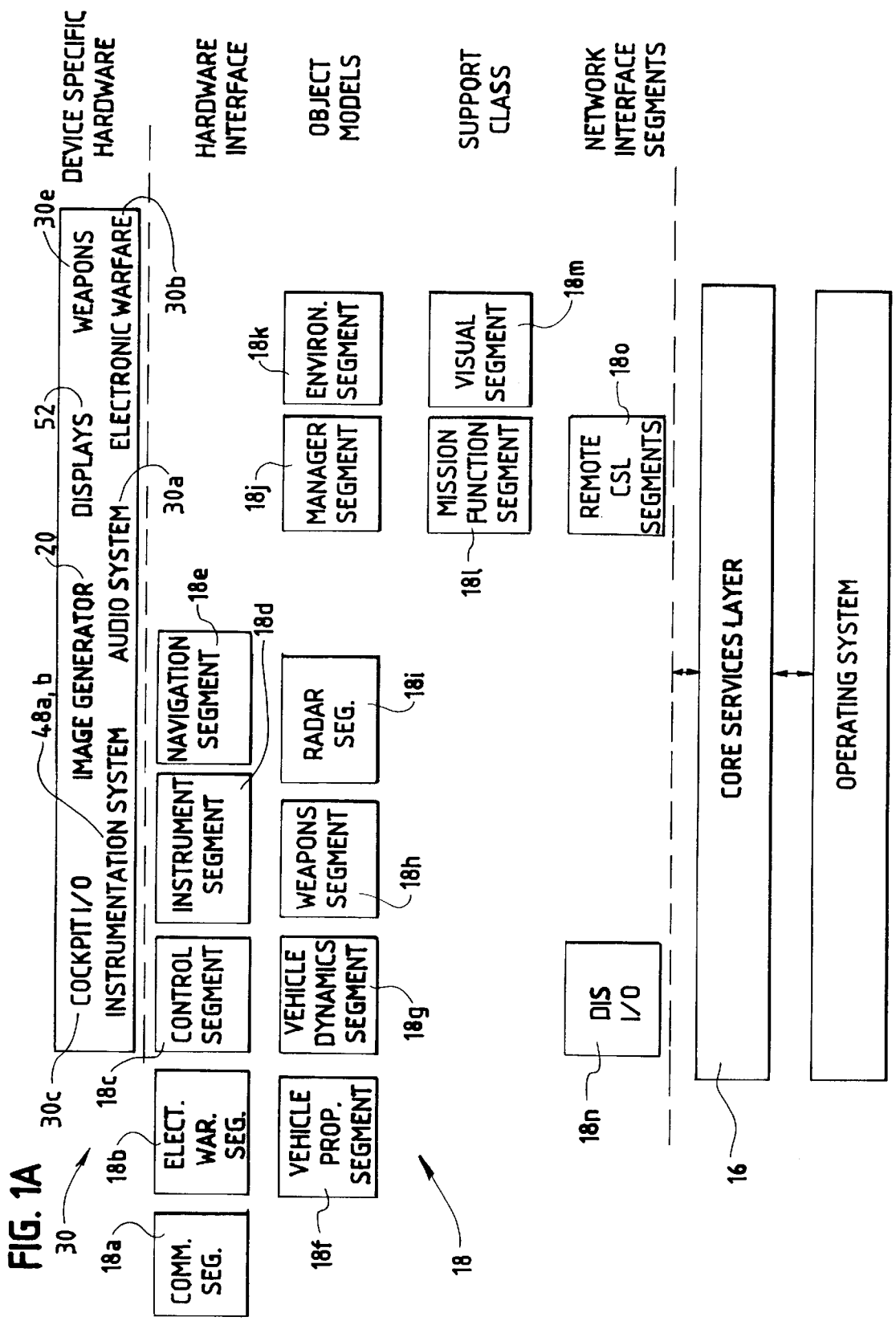

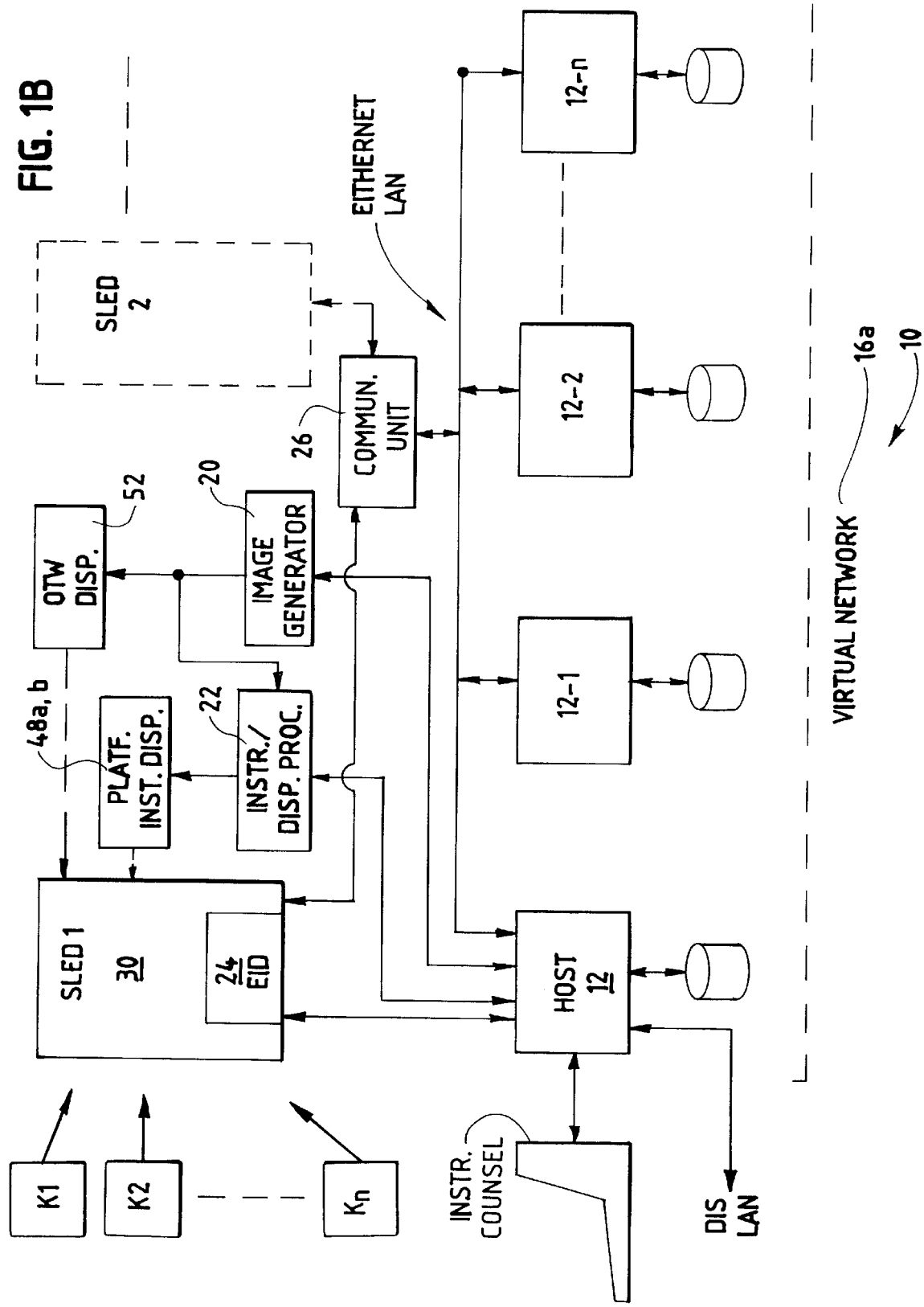

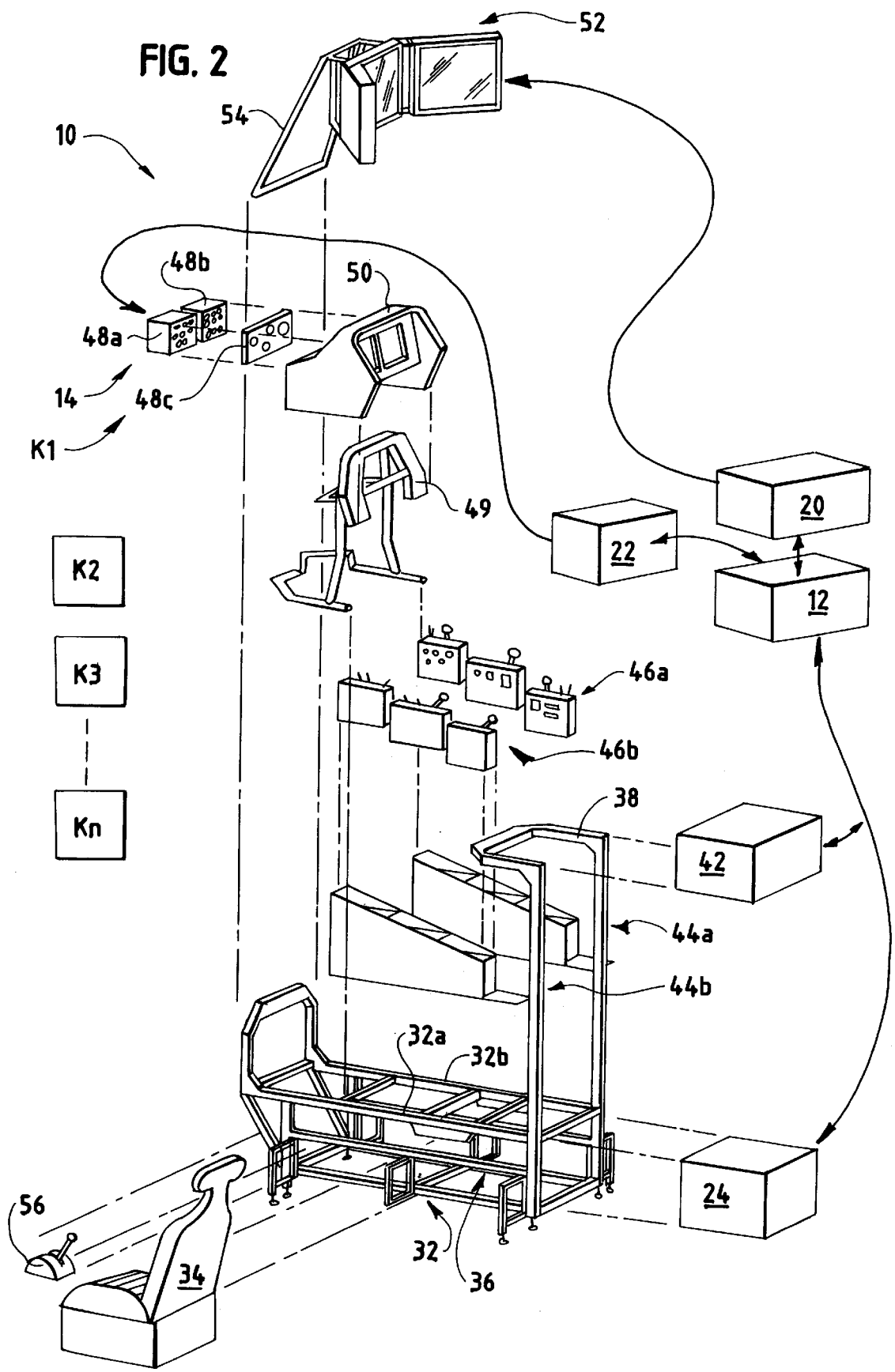

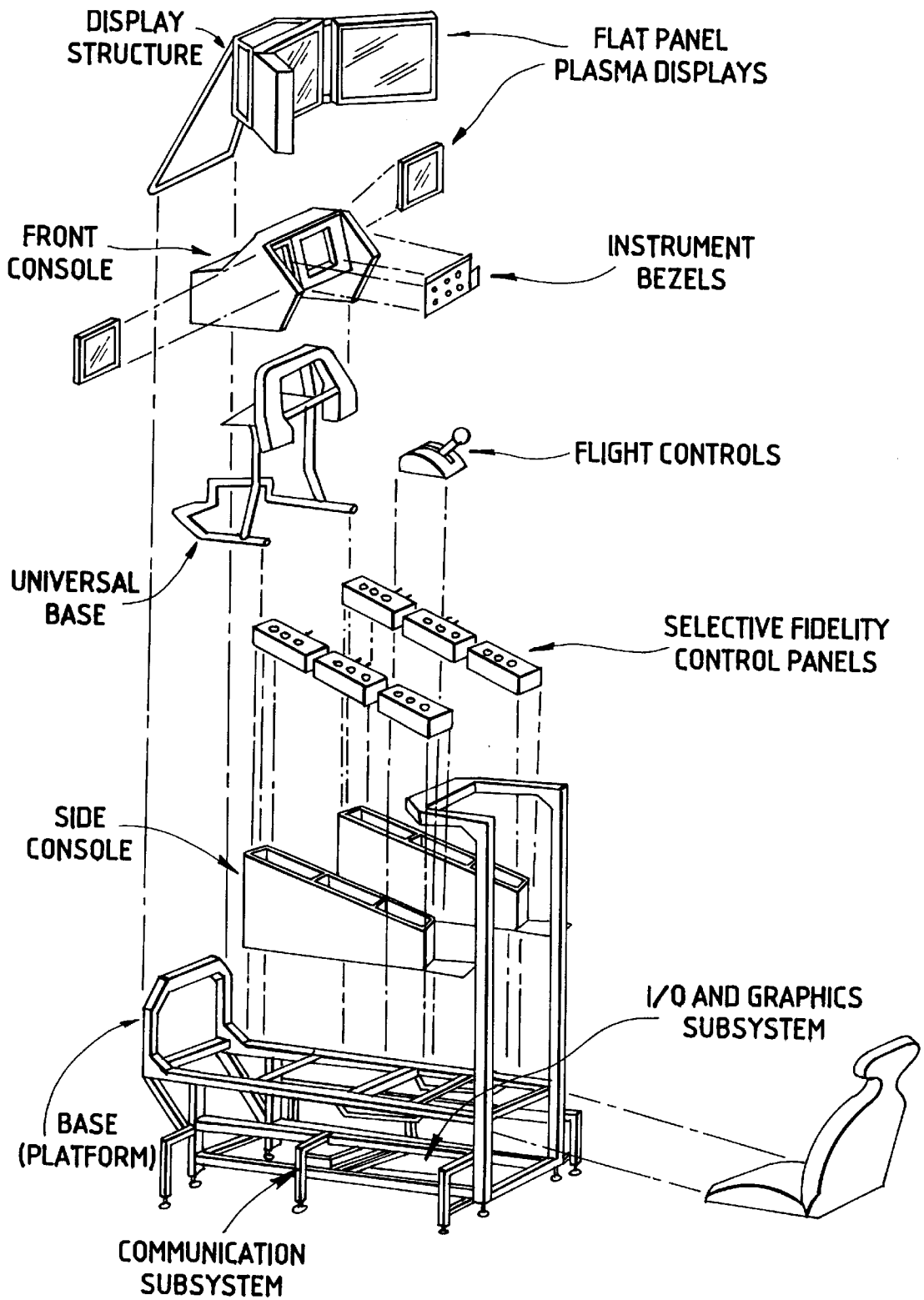
FIG. 2A HARDWARE COMPONENT BREAKDOWN-HELICOPTER

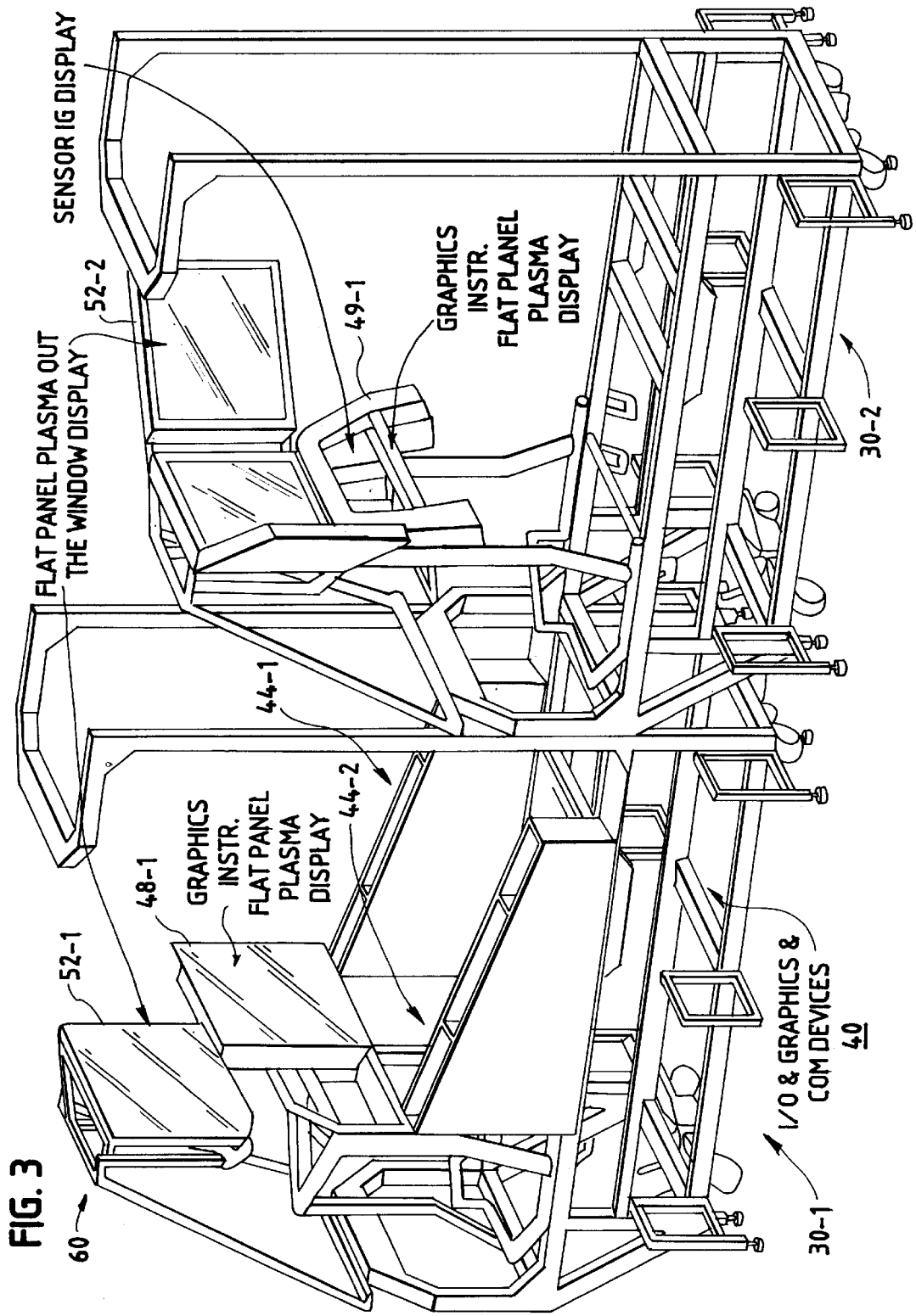

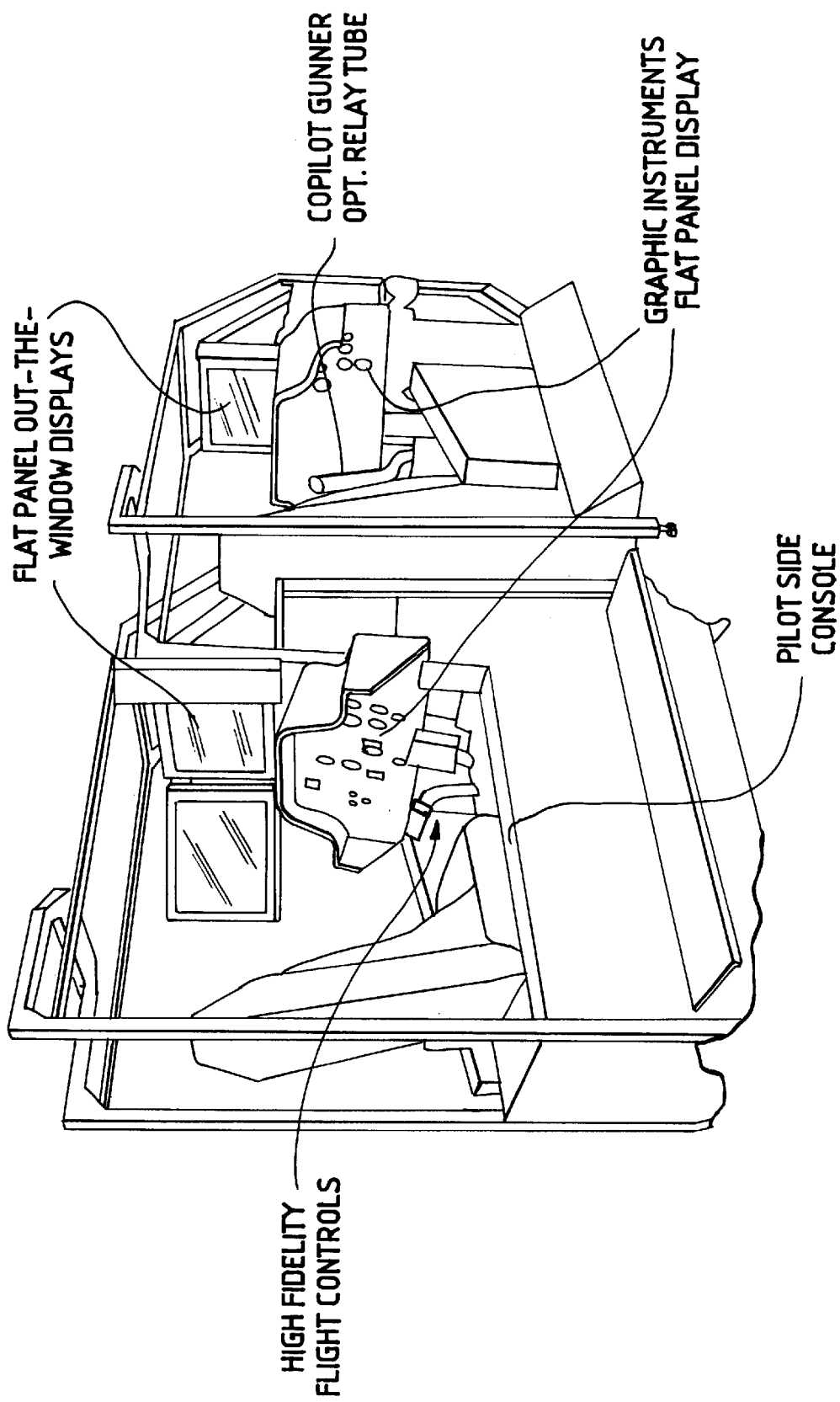
FIG. 3A  AH64 CONFIGURATION

FIG. 5

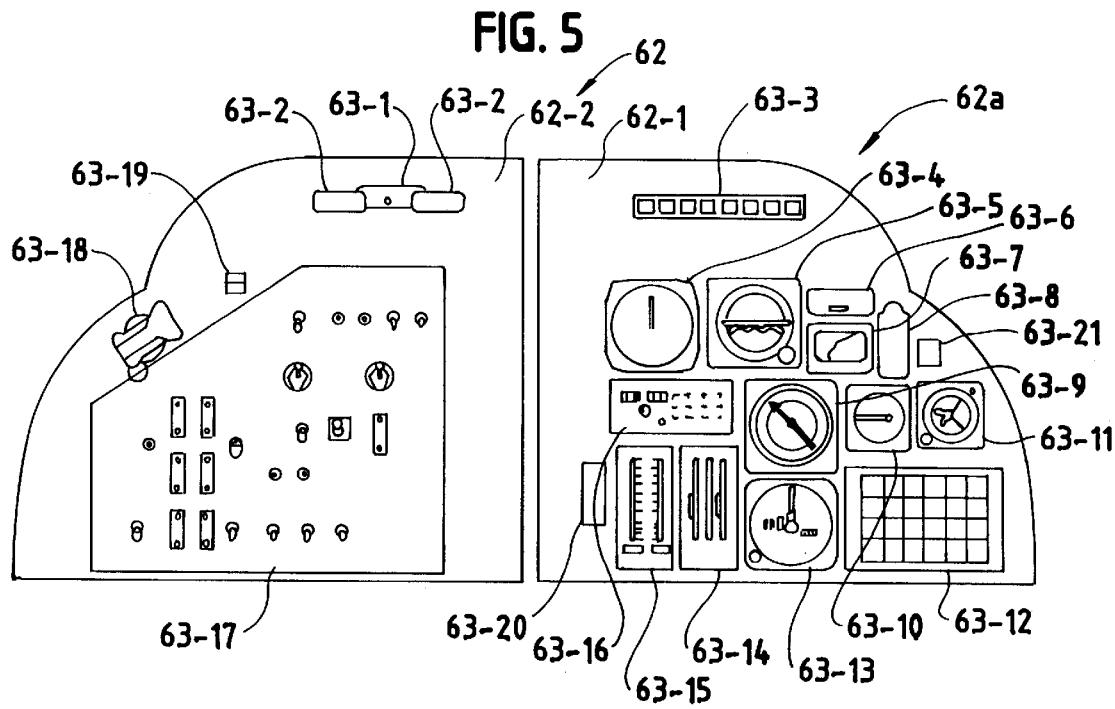

63-1 FIRE EXTINGUISHER BOTTLE SELECT SWITCH
63-2 ENGINE FIRE PULL HANDLES
63-3 MASTER CAUTION, WARNING PANEL
63-4 AIRSPEED INDICATOR
63-5 REMOTE ATTITUDE INDICATOR
63-6 RADIO CALL PLACARD
63-7 STABILATOR POSITION INDICATOR
63-8 STABILATOR/AIRSPEED PLACARD
63-9 RADIO MAGNETIC INDICATOR (RMI)
63-10 VERTICAL SPEED INDICATOR (VSI)
63-11 CLOCK
63-12 CAUTION/WARNING PANEL
63-13 BAROMETRIC ALTIMETER
63-14 ENGINE (Np), ROTOR (NR) INDICATOR
63-15 ENGINE TORQUE INDICATOR
63-16 SELECTABLE DIGITAL DISPLAY PANEL
63-17 FIRE CONTROL PANEL
63-18 CANOPY JETTISON HANDLE
63-19 ARM SAFE INDICATOR
63-20 ENGINE INSTRUMENT DIM/TEST PANEL
63-21 FUEL TRANSFER INDICATOR

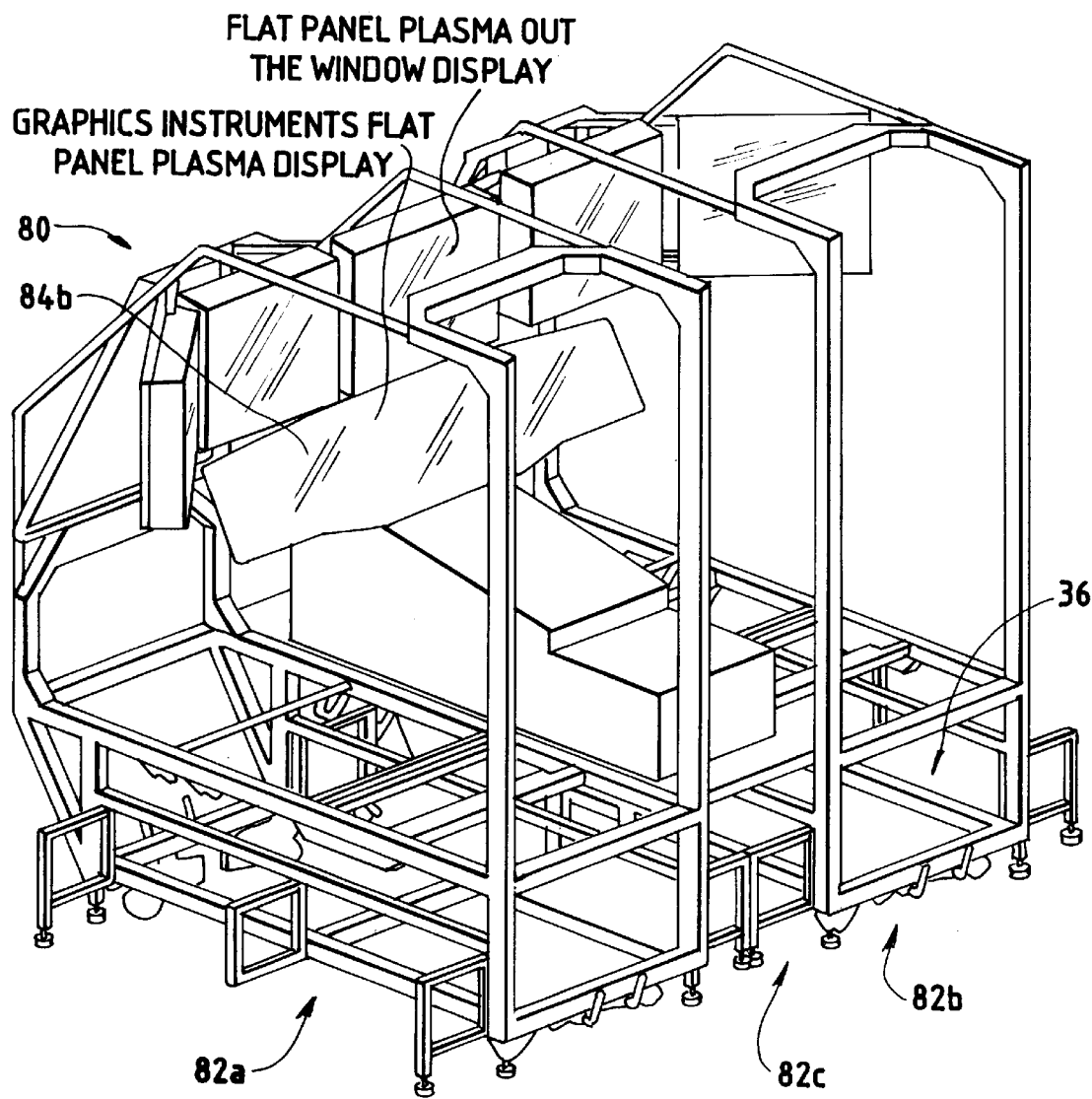

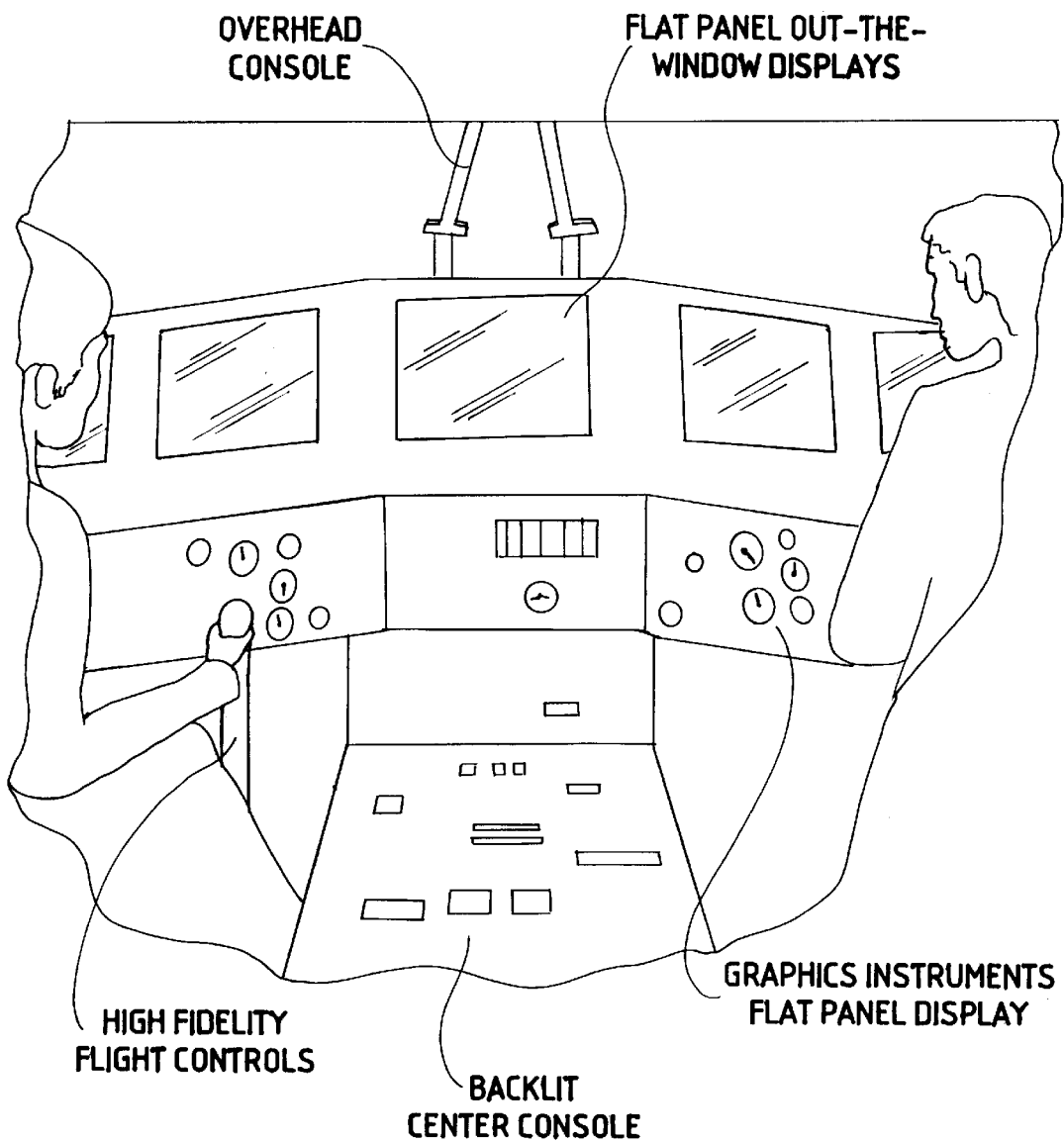
FIG. 7A  UH60 CONFIGURATION

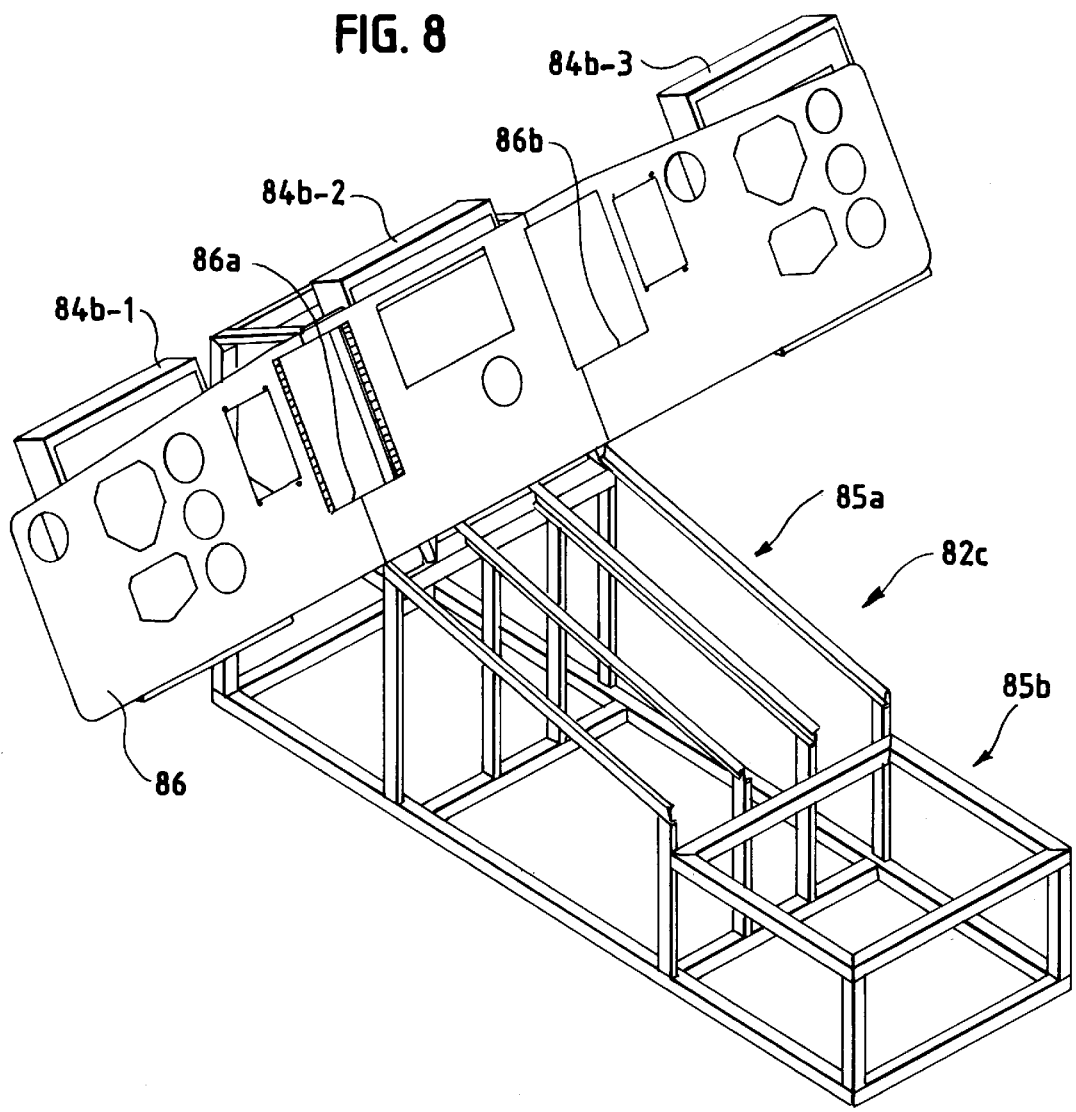

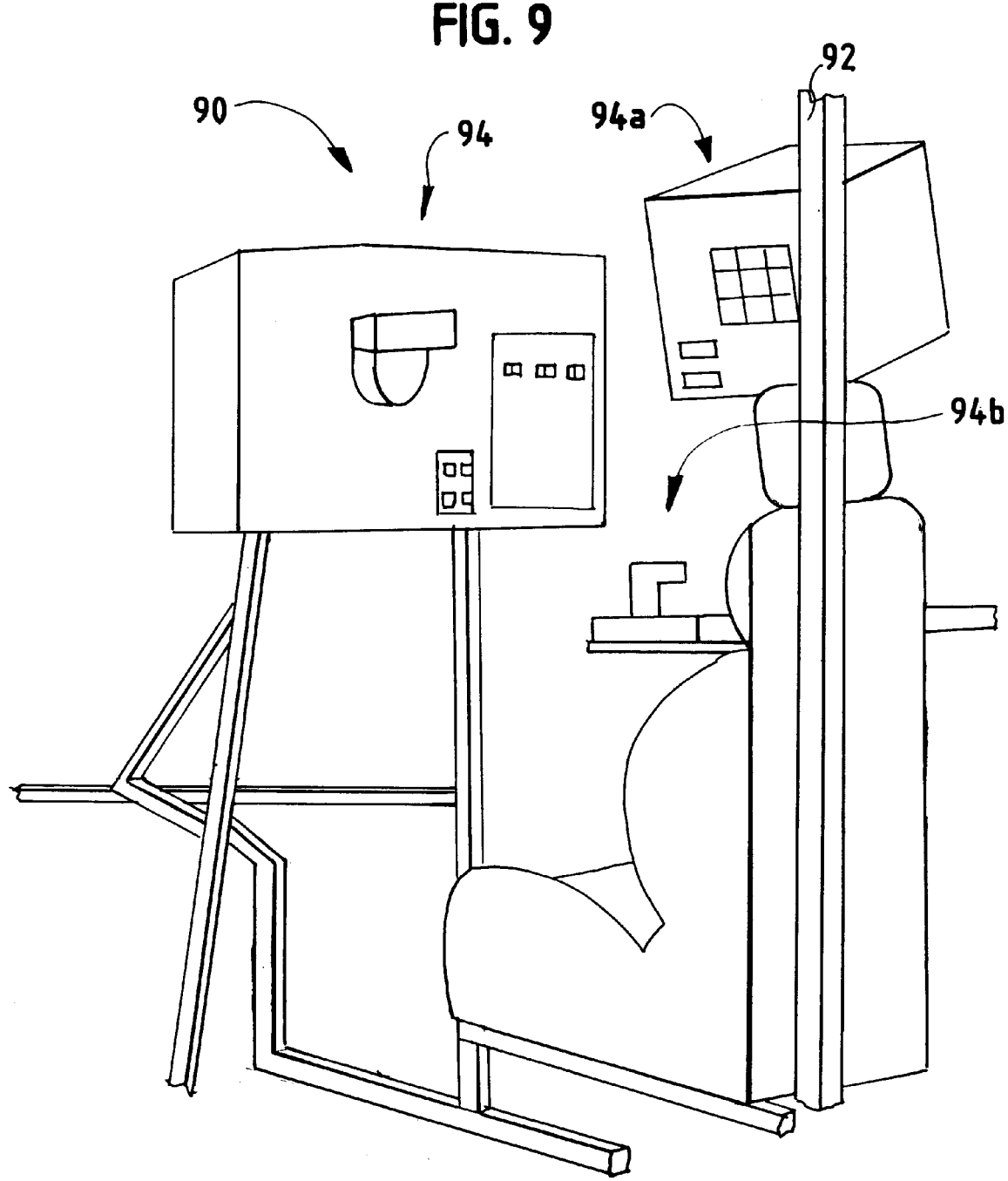

RECONFIGURABLE EASILY DEPLOYABLE SIMULATOR

This is a continuation-in-part of U.S. patent application Ser. No. 08/738,821 filed Oct. 25, 1996, now abandoned, entitled Reconfigurable Simulator.

FIELD OF THE INVENTION

The invention pertains to training simulators. More particularly, the invention pertains to modular, easily deployable training simulators which can be readily reconfigured to represent different types of controllable platforms such as land vehicles, air vehicles or sea vessels.

BACKGROUND OF THE INVENTION

Simulators for training drivers, and/or pilots in connection with various types of vehicles or platforms are known. Such simulators often provide a graphical display as well as representative mechanical structure corresponding to the control functions of the respective vehicle. Known simulators have been dedicated to a single type of vehicle.

As training needs change, in response to evolving vehicles or different threat patterns, it becomes desirable to be able to provide either updated or completely different simulators. The new simulators must be cost-effective in addition to meeting changing training needs. This in turn tends to make the existing equipment obsolete.

Apart from the problem of obsolescence, dedicated simulation systems are not intended to faithfully simulate a plurality of different vehicles or platforms. Hence, they are not useful in responding to changing mixes of training needs. Further, many of the known simulator systems tend to be bulky and are not readily movable from one location to another.

Thus, there continues to be a need for simulators which are more flexible than known simulators and which can be used in a variety of training exercises. There also continues to be a need for readily deployable simulators.

SUMMARY OF THE INVENTION

A modular hardware and software configuration results in a versatile, deployable system that can be quickly transformed into one of a plurality of platforms. Interchangeable control modules make for quick alteration of instruments, controls, switches, knobs, buttons, etc. and their functionality for training, virtual prototyping, and mission rehearsals on different configurations of the same system.

The system can be reconfigured from one vehicle to a completely different vehicle in just minutes using prestored control software and interchangeable vehicle personality kits. For example, the system can reconfigured from an attack helicopter cockpit to a tank gunner's compartment (two completely different types of platforms requiring vastly different vehicle dynamics, functionality, and crew station components). Both hardware and software can be reconfigured between these two very different configurations in less than 15 minutes.

Both the hardware and software architecture of the system are designed with a reusable core along with modular and flexible components. This design results in ease of expendability for future configurations, platforms, and enhancements. System architecture results in a selective fidelity platform simulator.

System hardware modularity is per person. Each simulator crewstation consists of a common base or "sled," and one vehicle "kit."

The sled has a frame/base structure and a seat. The frame/base structure is designed such that multiple vehicle "kits" may be easily mounted on the base to rapidly configure the sled for a particular vehicle or platform to be simulated.

In a preferred embodiment, the physical size of the frame is such that it will pass through a standard 30-inch wide do-or without any extreme difficulty. No component of the system requires more than a two-man lift. All components break down for easy shipment and deployability without major disassembly. Hence, this design lends itself not only to rapid modification from one platform to another, but also to ease in shipment and reassembly for field deployment.

The sled's electrical system communicates with a local host computer by means of an Electrical Interface Device (EID) design that provides a minimum update rate of 60 Hz for true real-time simulation. The EID communicates with the host computer through an Ethernet interface.

An image generator (IG) provides the number of display channels and fidelity needed for the vehicle being simulated. The system supports interfaces for a plurality of different image generators. The IG can be configured to provide imagery to the applicable vehicle displays, e.g., panel mounted sensors, fixed flat panel out the window (OTIV), and helmet mounted displays (HMD).

A PC-based instrumentation package can be used to provide simulated, real-time instrumentation that is displayed in each reconfigurable crewstation. This approach of functionally simulating the crewstation instruments electronically provides an ability to maintain high fidelity of critical gauges and instruments at a low cost. The rendered instruments are anti-aliased, providing for realistic moving gauges and indicators.

The instrumentation software design provides an ability to reconfigure, change or edit instrument displays and heads-up displays in real time, using a graphical user interface at both the host computer and the simulator cockpit or crewstation. Instrument attributes are updated by the host computer through an Ethernet interface.

The system supports a variety of different output display devices. Out the window display system options include flat panel plasma monitors, dome, or Helmet Mounted Display devices. The helmet mounted display provides see-through capability allowing full visibility of cockpit instruments and controls, as well as permitting visual interaction between crew members. A sensor/targeting monitor with 1X, 3X, and 18X field of view can be provided depending on the platform.

A digital audio communication system can be used for intercom communication between crew members, as well as communication between participating members of a distributed interactive simulation. In addition, the communication system provides an aural cue capability. Realistic vehicle and simulation sounds, can be provided to the crew members.

The sleds can be configured in a number of different combinations to simulate a particular vehicle. A single crewstation simulator is created by using one reconfigurable base/sled and one vehicle kit. For training multiple crew members, two bases/sleds are linked together in a tandem or side-by-side configuration and two vehicle kits are utilized.

System architecture includes three layers. These layers are: Core Services Layer, a software application layer which includes application segments, and a platform specific, hardware related layer.

Each layer is isolated itself from the previous layer, resulting in a loosely coupled system architecture. This permits use of the Core Services Layer for all-simulator design applications. In addition, potential reuse and reconfigurability of software modules and hardware components based on specific vehicle and a desired level of fidelity is enhanced.

The Core Services Layer resides on top of the operating system of the host processor. In addition to providing services, it isolates the application layer from the underlying operating system and hardware.

The Core Services Layer provides a message-based communication mechanism for the application layer. This includes application generic service calls, which consist of, but are not limited to, operating system calls, interprocess communication calls, shared resources, and task scheduling. The Core Services Layer can also provide a mechanism for synchronizing segment processing to external timing or to message delivery.

Each application segment communicates with other segments over a virtual network using software calls supported by the Core Services Layer. The virtual network implementation manages how the messages are read and/or written by the segments.

Segments running on the same host processor communicate through shared memory. Segments running on remote hosts are able to communicate over a local area network, such as an Ethernet, through a Remote Core Services Layer. All message passing is handled by the Core Services Layer, making interprocessor communications transparent to the user.

Hence, the Core Services Layer, residing, on each of a group of linked host processors, implements a multiprocessor network architecture that is transparent to an application segment being executed on a "primary" host. Application segments may all be executed on a primary host where there is only one processor. In a multi-processing environment, the exact processor on which, a given segment will execute may vary.

The Core Services Layer manages application segment and message information through use of a configuration file. This file is created through use of a file editor having graphical user interface. A configuration file is associated with each platform that can be simulated. For prototyping, configuration files can be created for platforms under development which do not exist in a physical sense.

The file editor provides the ability to create and save new configuration files or open and modify existing configuration files. Through this editor, messages and segments can be visually added, deleted, or modified, and the user can assign the platform and processor on which each segment will run.

The application software layer includes several independently executing integrated segments, each of which can be implemented in a high-level language. These segments are groups of objects or functions closely related to one another internally. They are loosely coupled to objects or functions in other segments. Main segments can include: Vehicle Controls Segment, Environment Segment, Mission Functions Segment, Vehicle Dynamics Segment, Visuals Segment, Weapons Segment, Navigation Segment, Instructor Segment, Electronic Warfare Segment, Crewstation Segment, Physical Cues Segment, and a DIS Input/Output Segment.

Segments can be generated through the use of the Core Services Layer, the graphical user interface, manually, or by using commercial off-the-shelf modeling tools. Real-time vehicle dynamics and models and weapons systems can be conveniently developed using these tools. After model development and validation have been completed, the modeling tools provide a capability to convert the system block diagrams directly to compiled real-time executable software. This code generation capability allows the vehicle dynamics and weapons models to be rapidly changed by an operator to match future vehicle upgrades.

The application layer segments are modular and loosely coupled, allowing changes in these segments or additions of other segments required for different vehicle simulators to be easily integrated. Furthermore, existing segments may be reused for several different vehicle configurations.

Other features and advantages of the present invention will become readily apparent from the following detailed description, the accompanying drawings, and the appended claims.

BRIEF DESCRIPTION OF THE DRAWINGS

FIG. 1A is a diagram illustrating a layered architecture in accordance with the present system;

FIG. 1B is a hardware block diagram of the present system;

FIG. 2 is an exploded view, partially in perspective, of a modular crewstation in accordance with the system of FIGS. 1A and 1B;

FIG. 2A is an exploded view, partly in perspective, of another modular crewstation in accordance of the system of FIGS. 1A and 1B;

FIG. 3 is a perspective view of a particular form of a two-person platform being simulated;

FIG. 5 illustrates the arrangement of FIG. 4 with simulated instruments and meters being displayed along with mechanically operable switches;

FIG. 7 is a diagram illustrative of a dual module simulation device based on the modular unit of FIG. 2;

FIG. 8 is an enlarged perspective view illustrating details of the central console of the system of FIG. 7;

FIG. 9 is a view of yet another single crewstation configuration;

DETAILED DESCRIPTION OF THE PREFERRED EMBODIMENTS

Figure 1C:
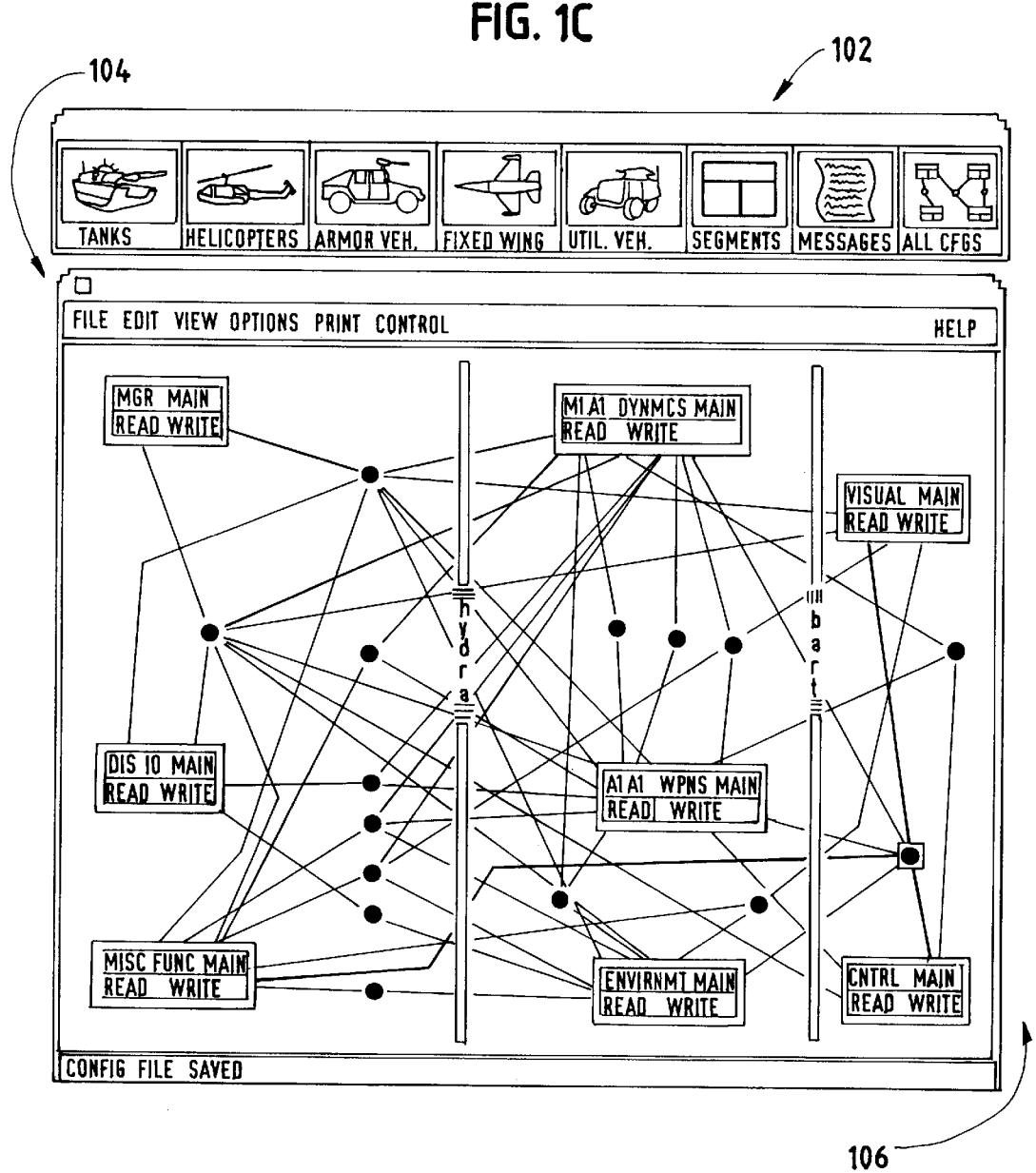
FIG. 1C is a view of a main window presented by a graphical editor of the present system.

While the present invention is susceptible of embodiment in various forms, there is shown in the drawings and will hereinafter be described a presently preferred embodiment, with the understanding that the present disclosure is to be considered as an exemplification of the invention, and is not intended to limit the invention to the specific embodiment illustrated.

FIGS. 1A and 1B illustrate various aspects of a system 10 in accordance with the present invention. The system 10 incorporates at least one host processor generally indicated at 12. The processor 12, could, for example, be implemented as using a workstation of a type commercially available.

A SUN workstation, with a Solaris 2.4 Operating System can be used as the platform for the reconfigurable host 12. The host computer 12 contains hardware to interface with an image generator 20, an instrument computer 22 to drive an instrument display on the sled 30, and an electrical interface device (EID) 24 carried on a sled 30. A digital communications module 26 provides communication between sleds such as 30 and 30'. The software for the system 10 is portable to other UNIX work stations and to PCS.

The Image Generator (IG) 20 provides a number of display channels for the desired vehicle simulator. The IG 20 is configured to display the desired level of fidelity for the simulation application. The IG communicates to the host computer 12 through an Ethernet interface.

The IG 20 is configured to provide imagery to the applicable vehicle displays, e.g., panel mounted sensors, fixed flat panel Out-the Window (OTW), and Helmet Mounted Display (HMD) with see-through capability. The system includes standard interfaces for use with commercially available generators such as the Lockheed Martin COM-PU-SCENE SE, PRO 1000 IG products, and Silicon Graphics IG products.

The computer 22 with instrumentation software is used to render the real-time instrumentation displayed in each reconfigurable cockpit. An Evans and Sutherland AVIDS software tool can be used to develop and configure the instrument displays. The instrumentation design permits changes or editing of instrument displays and heads up displays in real time, using a graphical user's interface at both the host computer workstation 12 and the simulator cockpit 30. The Instrumentation PC 22 communicates with the host computer 12 through an Ethernet interface.

The display system 20 is designed with maximum flexibility, allowing the system to match specific user needs or specifications in terms of Field-of View (FOV), magnification, and resolution. The current display system uses multiple flat panel displays for OTW imagery and high resolution monitors for sensor/targeting imagery.

A HMD type display may be used with the system 10 in lieu of monitors and flat panel displays or in addition to them, as the user desires. The HMD provides see-through capability, allowing; full visibility of cockpit instruments and controls as well as permitting visual interaction between crew members. All monitors, flat panel displays, and the HMD can be adjusted within limits to meet user needs.

The image generator 20 provides multiple channel, through the window-type views of a terrain in the immediate area of the platform being simulated. A plurality of image generators (not illustrated) 20h . . . 20n can be provided so that a plurality of different displays can be used with the system 10.

Selection of a type of output display will be based on balancing considerations such as cost, type of platform, and level of fidelity needed in the output display so as to provide an adequate level of training for the user of the platform being simulated. To facilitate conversion from one type of image generator to another, a plurality of different visual segments can be stored in the system 10. A particular image generator can be specified by an instructor's console coupled to processor 12.

The processor 12, in addition to an operating system of a type usable with such workstations, also supports a Core Services Software Layer (CSL) generally indicated at 16. The Core Services Layer 16 provides services of the type described below to a plurality of application layer object oriented segments indicated generally at 18. The CSL 16 can also facilitate communications via the operating system, with a plurality of device-specific hardware structures generally indicated at 30.

Some of the segments communicate with devices in the plurality 30 without using CSL 16. These include the Control segment, the Instrument Segment, and the Navigation Segment.

The core services layer 16 can also be used to provide transparent communications to and from a remote host, such as 12-1, 12-n, as part of a local area, virtual, network 16a. The remote host might in fact be responsible for executing one or more of the members of the plurality of application layer segments 18.

The "virtual" network 16a might include just the host 12. Alternately, it might additionally include remote hosts 12-1, 12-2 . . . 12-n. Implementation of distributed systems is discussed in *Distributed Systems*, Ed. by S. Mullender, U of Twente Netherlands, ACM Press, 1993.

The architecture of the system 10 provides an open, scalable, reconfigurable, and modular architecture for simulation software applications. As illustrated in FIG. 1A, each layer of the system architecture isolates itself from the previous layer.

The Core Services Layer 16 (CSL), provides a message based communication mechanism for the application layer 18. The application layer 18 includes object-like software segments that read and write messages using the CSL functions. The object oriented approach in simulation has been discussed in *Object Oriented Modeling And Design*, J. Rumbaugh, Prentice Hall, 1991.

The segments are characterized by the messages they read and write, as well as the hardware with which they interface. This modularity allows each segment to be easily modified or replaced without impacting the rest of the system.

The CSL 16 isolates the application segments 18 from the underlying operating system and hardware. The CSL provides application generic service calls, which include, but are not limited to, operating system calls, inter-process communication calls, shared resources, and task scheduling.

The application layer 18 includes of several independently executing integrated segments, each of which can be developed in a high level language such as ADA. These segments are groups of objects or functions closely related to one another internally and are loosely coupled to objects or functions in other segments. The segments communicate between themselves via messages on the virtual network 16a implemented by the CSL.

FIG. 1A illustrates exemplary main segments of a typical application layer usable to implement a variety of simulating of different platforms. These include: hardware interface segments, object model segments, support segments and network interface segments. The interface segments include Communications 18a, Electronic Warfare 18b, Controls 18c, Instruments 18d, Navigation 18e, in a hardware interface level. Vehicle Propulsion 18f, Dynamics 18g, Weapons 18h, and Radar 18i, along with Manager Segment 18j and an Environment Segment 18j make up an object model level.

Support segments include Mission Function 18*l* and Visuals 18*m*. Network interface segments include DIS I/O 18*n* and Remote CSL segments 18*o*.

All segments are loosely coupled, so changes in these segments or additions of other segments required for different vehicle simulators are easily integrated. Existing segments may be refused for several vehicle configurations. For example, only vehicle controls, vehicle dynamics, and weapons need to be altered to convert from an AH-64 to a UH-60 helicopter configuration as discussed subsequently.

The CSL 16 manages the segments through use of a configuration file. Information regarding segments and messages used in the simulation is stored in the file. An editor with an icon driven graphical user interface is available as part of the CSL allowing the creation, saving, or modification of existing configuration files. FIG. 1C illustrates a user manipulatable main window for the editor.

Segments may be generated in executable form once they have been defined in the Graphical User Interface, illustrated in FIG. 1C, using commercially available modeling tools. Real-time flight dynamics and models and weapons systems can be developed using a software package, Matrix X (Trade Mark of Integrated Systems Inc.).

Figure 1D:
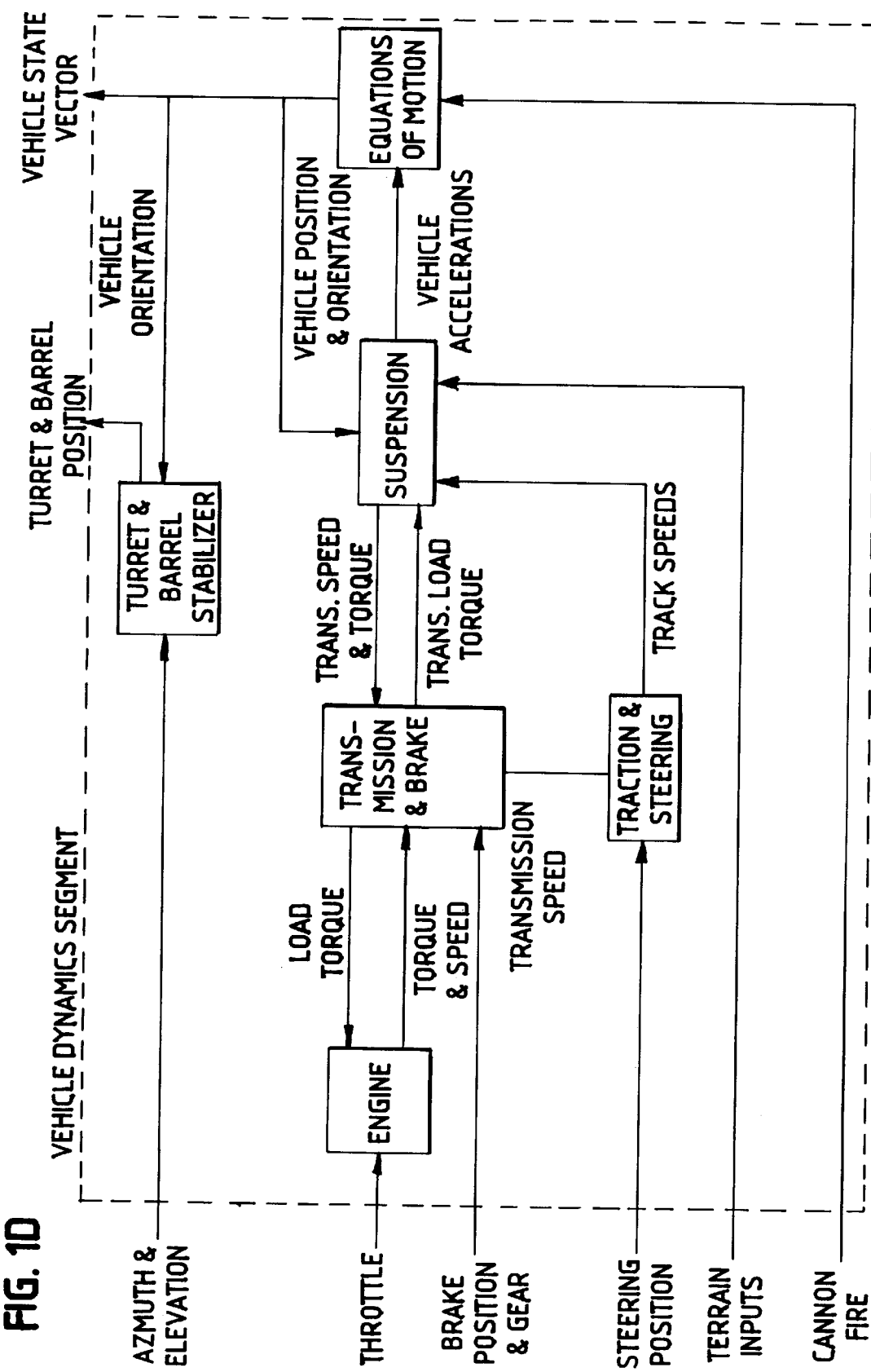
FIG. 1D illustrates a block diagram specification of dynamics of a selected vehicle.

Matrix X is a commercially available software simulation package used to develop and analyze models of multiple input/multiple output nonlinear systems. This software package allows a user to create models using a graphical user interface. Icons are connected to form block diagrams of the modeled system. The icons represent mathematical operators which the program uses to produce and solve systems of equations. FIG. 1D illustrates a vehicle dynamics segment represented in block diagram form.

Matrix X provides the analysis tool; (such as curve fitting routines, frequency response computation, plotting routines, etc.) needed to develop, analyze, and validate flight dynamics models. After completion of model validation, Matrix X provides the capability to convert the system block diagrams directly to real time software in languages such as ADA or C. This same capability allows the flight dynamics model to be rapidly changed by the user to match future aircraft upgrades.

The electrical system utilizes an Electrical Interface Device (EID) 24 which provides a minimum update rate of 60 Hz for true real-time simulation. This update rate is especially important for flight vehicle simulators. The modular EID 24 utilizes commercially available components and supports expendability. The EID communicates to the host computer 12 through an Ethernet interface.

FIG. 2 illustrates a preferred form of the simulator or training module 30. The module 30 is particularized for a specific platform and/or simulation exercise by using one member of a plurality of multi-personality, platform kits K1, K2 . . . Kn.

A common one-person hardware frame or sled 32 is the basic building block for the module 30. The frame or sled 32 is associated with an individual operator or member of the platform crew.

The frame/base structure 32 is designed so multiple vehicle "kits" may be easily mounted on the base to rapidly configure a particular vehicle simulator. The frame structure design includes easily assembled/disassembled members. Power and data distribution cables are concealed within the frame's tubular design. The frame houses all power, video, and data interface connections.

Each frame is equipped with free rotating castors for easy transport, and leveling pads for use when in position for training. No component of the assembly requires more than a two man lift. All components break down for easy shipment without major disassembly and pass through a standard 30 inch door.

The frame 32 includes a seat 34 intended to be used by the individual crew person associated with that particular aspect of that platform. Single crew or multiple crew platforms can be simulated as described subsequently.

The frame 32 provides a lower region, generally indicated at 36, for receipt of power supplies, electronics, connectors, and I/O interface electronics (the EID) generally indicated at 24. The frame 32 provides an upper mounting region 38 to which a heads-up projection display system 42 can be mounted. As an alternate to the display system 42, the operator can be provided with the helmet-mounted display unit.

The standardized frame 32 can be personalized to a particular platform by use of platform-specific kits such as K1, K2 . . . Kn. Kit K1 is illustrated with the sled 32.

Kit K1 provides platform-specific control and displays by using, for example, removable consoles 44*a*, 44*b*, which would correspond to the configuration, appearance, and arrangement as expected to be found in the platform being simulated. The consoles 44*a*, 44*b* are removably attachable to side members 32*a*, 32*b* of the frame 32.

To further conform the appearance of ihe unit 32 to that of a specific platform, the consoles 44*a*, 44*b* are adapted to receive a plurality of control modules indicated generally at 46*a* and 46*b*. The control modules 46*a*, 46*b* removably engage the console members 44*a*, 44*b* and are also of a type which would be expected to be found in the platform being simulated.

The control modules 46*a*, 46*b* can include switches, levers, or dials which can be operational, in which event they are in communication with the interface system 24. Alternately, depending on the nature and purpose of the simulation or training exercise, the members of the plurality 46*a*, 46*b* could be merely graphical depictions of certain control elements which, are unimportant or irrelevant from the point of view of a particular simulation or training exercise to be carried out.

The frame 32 can be further configured to exhibit the personality of the platform being simulated by the addition of platform-specific display devices or instruments 48*a*, 46*b* which are supported in appropriate orientation and arrangement at the front end of the frame 32 as would be expected for the platform being simulated. It will be understood that the devices 48*a*, 48*b* could be computer-driven display devices which are intended to simulate actual instruments or displays found in the platform being, simulated.

The displays 48*a*, 48*b* could be, for example, flat panel plasma displays. The displays 48*a*, 48*b* can be coupled to and be in communication with the instrument computer 22. The displays 48*a*, 48*b* can be driven by channels of the image generator 20 and updated locally by an instrument simulating computer 22.

Overlying the displays 48*a*, 48*b* is template 48*c* which corresponds to the shape and appearance of the instruments being simulated, and covers the edges of the template 48*c*. A frame 49 supports the displays 48*a*, 48*b*. A bezel structure 50 of a type which would correspond to the appearance of the instrument panel of the platform being simulated. A user located in the seat 34, when looking toward the bezel 50 and the computer-driven displays 48*a*, 48*b*, would see a plurality of platform sensors, instruments, gages, and display devices exactly corresponding to those found in the platform being simulated.

Out-the-window displays 52 are provided by one or more display devices, which might, for example, be flat panel plasma displays, for the purpose of providing to the user a view of a simulated adjacent terrain in which the platform being simulated is located and possibly moving. The display units 52 are configured and oriented so as to duplicate the arrangement of the windows, if any, of the platform being simulated. The displays 52 are mounted and held in an appropriate orientation by a mechanical framework 54 which is intended to couple to the frame 32.

The device interface circuitry 24 is in bi-directional communication with the host computer 12. The host computer 12 is, in turn, in communication with the hardware display or image generator 20 which presents three-dimensional displays on the display elements 52.

The system 10 supports a plurality of different image-generation systems which in turn drive a plurality of different display devices of varying fidelity depending on platform requirements and costs.

It will be understood that the system 10, as illustrated in FIG. 2, can be used to create both visually and mechanically correct modularly based structures which simulate the appearance and behavior of a platform being simulated.

Platform controls are provided by platform-specific joy sticks, levers, steering wheels, or rudder controls, generally indicated at 56 which are intended to be releasably coupled to the frame 32. These control elements are all in communication with the interface circuitry 24.

The module 30 can include additional platform specific hardware not noted above. For example, an audio subsystem 30*a* coupled to communications unit 26, can be used to provide audible cues and realistic vehicle simulation sounds to crew members to enhance the realism of the simulation. An electronic warfare subsystem 30*b* implements the electronic warfare capabilities, if any, of the vehicle being simulated. Cockpit module 30*c* provides additional manually operable cockpit controls including switches, knobs, joy sticks, control levers, and the like which would be associated with the operation of the vehicle being simulated. A weapons subsystem module 30*e* provides weapons-related functionality enabling the user to control or activate weapons of a type associated with the platform being simulated.

FIG. 3 illustrates a system 60 having, a tandem configuration wherein two frames 30-1, 30-2, of the type previously discussed, are arranged to correspond to the cockpit of an AH64A attack helicopter. Frame 30-1 has been configured to correspond to the displays and controls for a co-pilot/gunner. Frame 30-2 has been configured with another kit to correspond to the controls and displays of a pilot. An outer shell covers each crewstation to provide a representation of an enclosure.

Frame 30-1 has been configured with modules, such as console modules 44-1, 44-2 which correspond to a personality kit for the co-pilot/gunner portion of the AH64A helicopter. Similarly, frame 30-2 carries a personality kit which configures it to conform to the appearance of the pilot's control elements, displays, and gauges of the AH64A helicopter.

The two sled configuration utilizes a five channel IG which drives the OTW displays and the sensor displays. A three channel instrumentation system is used to provide real-time instrumentation within each crewstation. In addition, navigation and radio communication capabilities have been provided.

The AH64A pilot station kit consists of the front and side console assemblies, including all instruments, switches, and indicators determined to be critical for training. The cyclic, collective, and pedal assembly provide realistic simulator controls. OTW imagery is provided by either three plasma displays, or a head tracked HMD. The simulated sensor video display unit (see FIG. 6) is a repeat of the copilot/gunner's sensor view.

The AH64A co-pilot/gunner station kit consists of front and side console assemblies, including all critical switches, instruments, and indicators. The gunners Optical Relay Tube (ORT) is provided, including gunnery switches and controls, a Heads Down Display (HDD) and the Heads Out Display (HOD). Through the HDD, the gunner has the ability to switch between OTW and sensor display. The pilot's OTW view is repeated in the copilot/gunner's crewstations.

It will be understood that the frames 30-1 and 30-2 would each incorporate a template and a bezel, corresponding to the bezel 50, for the purpose of covering flat panel plasma display 48-1, 49-1, corresponding to the displays 48*a* and 48*b*, for example. This will present an optical appearance to the individuals participating in the simulation as the pilot and co-pilot which corresponds to the overall appearance of the interior of the corresponding cockpit.

Figure 4:
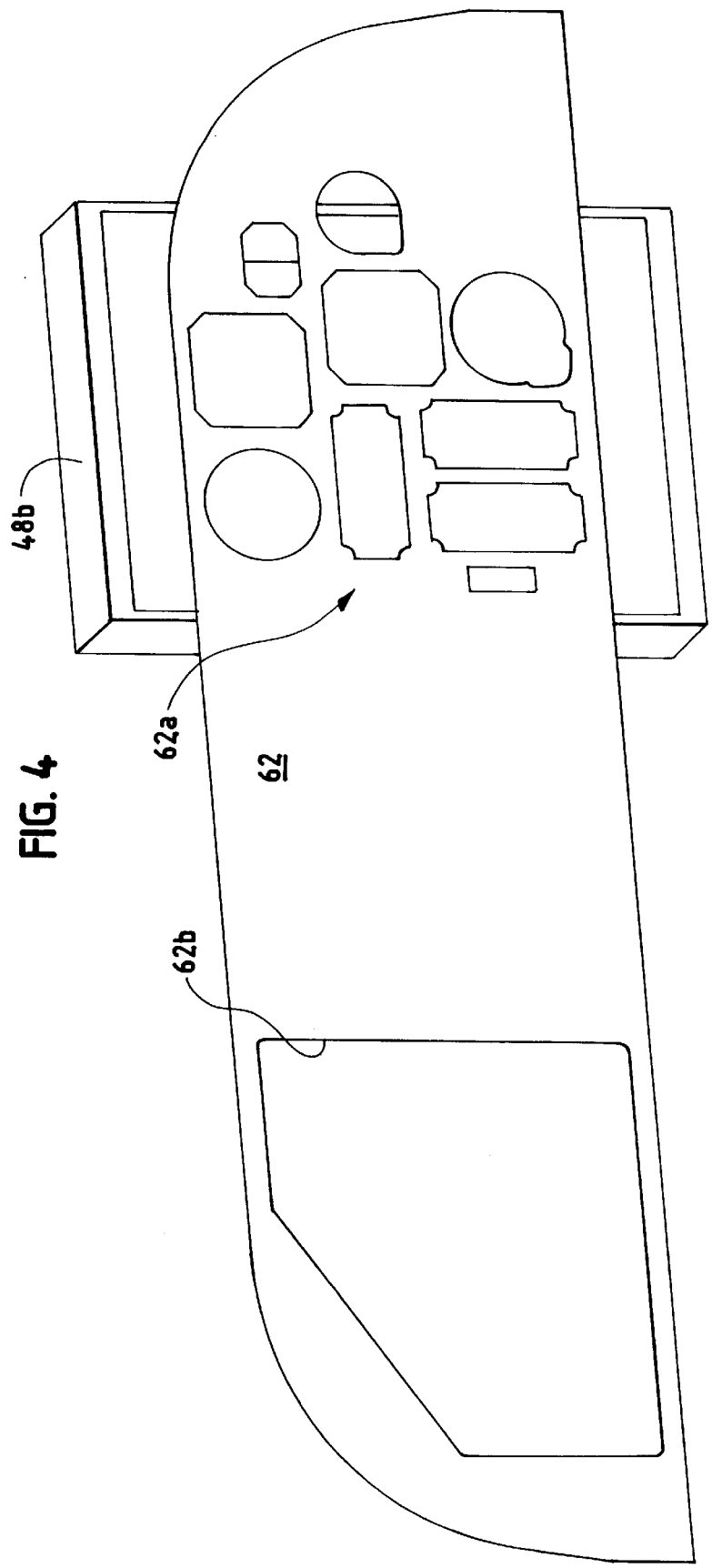
FIG. 4 is a view illustrating an instrument defining template in combination with a flat panel plasma display.

FIG. 4 illustrates for one of the cockpit displays, for example, the display 48*b*, the use of an overlying template 62. The template 62 could be part of, or attachable to, a bezel, such as the bezel 50.

The template 62 includes a number of cut-outs illustrated generally at 62*a* which correspond to the instruments and displays of, for example, the AH64A cockpit. Hence, the computer-generated displays of instruments, gauges, output indicators, and the like, presented on the flat panel display 48*b*, by means of the template 62, can faithfully replicate the appearance of the corresponding devices that are actually present in the cockpit.

The template 62 also carries an open region 62*b* which can be for the purpose of presenting another display of the type which would be found in the respective cockpit. Alternately, the opening 62*b* can receive a modular control element found in the corresponding aircraft at that location for purposes of replicating the structure which would be seen by one of the crew members in that aircraft.

FIG. 5 is a further illustration of template 62 having two sections 62-1 and 62-2. The section 62-1 carries the plurality of cut-outs 62*a* illustrated in FIG. 4. As illustrated in FIG. 5, those cut-outs correspond to and frame a plurality of simulated gauges, indicators, and displays 63-4 through 63-16, 63-20 and 63-21.

The portion of the template 62-2 carries a plurality of control switches and the like including elements 63-1, 63-2, and 63-17 through 63-19.

Signals received from the control elements 63-1, -2, and 63-17 through -19 can be made available to the host processor 12 via interface element 24. Similarly, the displays presented on the portion of the template 62*a* are driven from commands produced by the display computer 22 and transferred to the flat panel display 48*b*.

Figure 6:
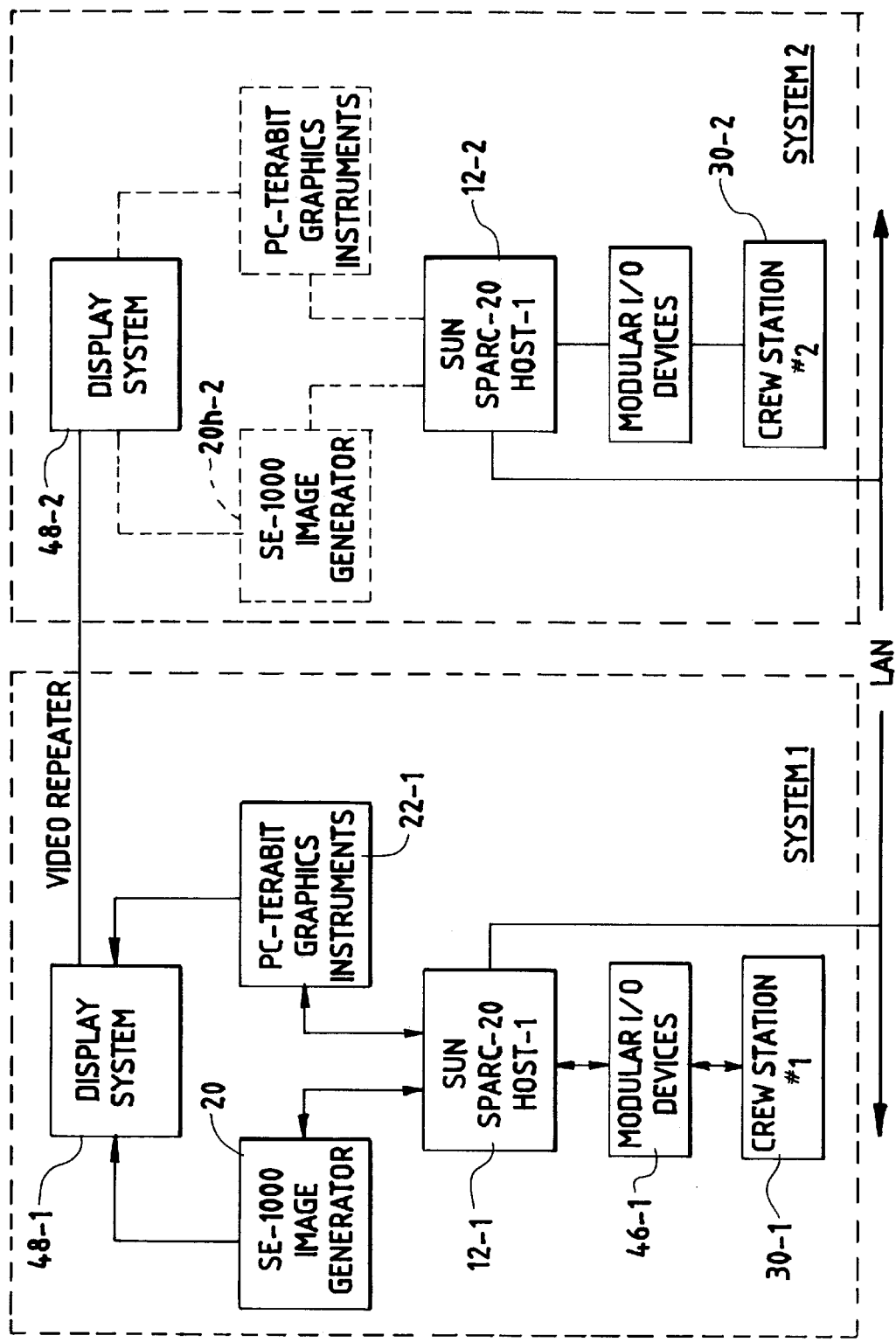
FIG. 6 illustrates a block diagram of one particular electronic implementation of the platform being simulated in FIG. 3.

FIG. 6 is a block diagram illustrating various aspects of one implementation of the system 60 where each of the crewstations 30-1 and 30-2 has associated therewith its own host processor 12-1 and 12-2.

The host processor 12-1 in turn provides signals to drive image generator 20. Host 12-1 is also in bi-directional communication with instrument display processor 22-1 which is used to generate and to update the real-time instrument display, such as the display 48-1, illustrated in FIG. 5, of cockpit indicators and instruments. These images can be replicated on station 2, display 48-2.

The system design incorporates commercial components and commercial interface standards to minimize cost and provide maximum expendability. Using commercial components and an architecture consisting of well-defined system modules, the design provides for ease of fault detection and isolation, interchangeability, and replacement of parts. The modular system design also allows future expansion for new vehicle kit configurations, and incorporation of new technologies with minimal non-recurring cost.

A UH-60 utility helicopter configuration 80, see FIG. 7, is an alternate simulatable vehicle. This system includes two modular sleds 82a, 82b, placed in a side by side configuration, as illustrated in FIG. 7. The sleds 82a, 82b, are identical to the sleds 30-1 and 30-2 of FIG. 3. They are particularized for the UH-60 platform by two UH-60 vehicle kits and a common control console 82c.

A copilot observer kit is mounted on the left sled 82a, while a pilot station kit is mounted on the right sled 82b. The center instrument console 82c is mounted between the two stations. An outer shell or bezel covers the entire cockpit to provide a representation of the actual enclosure.

The two sled configuration requires one five channel image generator to drive five OTW displays 84a. Real-time instruments are provided using a three channel instrumentation system 84b. A communication and navigation system are implemented. In this configuration, either the copilot observer of pilot may assume control in real-time.

The pilot and copilot observer stations in FIGS. 3 and 7 have common characteristics that grow out of a modular approach. Both stations are complete with front and side consoles, including all switches, indicators, and instruments required for training. Each crewstation contains collective, cyclic, and pedal controls to provide either station the ability to fly.

FIG. 8 illustrates further details of the common central console 82c. As illustrated in FIG. 8, the console 82c is supported on a multi-element frame. While not shown, the upper surfaces of the console, indicated generally at 86a and 85b, can be filled with modular, manually operable control elements and gages, displays, or meters of a type which would normally be found in the UH-60 platform.

The three channel instrumentation system 84b, having display elements 84b-1, 84b-2, and 84b-3, illustrated in FIG. 8 is covered in part by a template 86 which corresponds to the shape, arrangement, and appearance of instruments, gages, dials, and read-out devices normally found in the cockpit of the platform. As described previously with respect to the configuration of FIG. 3, as illustrated in FIG. 5, the use of templates, such as template 86, results in realistic looking read-outs and gauges of a type that would be found in the subject platform. Further, the template 86 includes openings 86a, 86b which could be filled with modular switch/control elements again replicating those found in the subject platform.

FIG. 9 illustrates a gunnery configuration 90 based on a modular sled such as the unit 32. The system 90 includes a supporting sled 92 which, in turn, supports gunnery display and associated controls 94. An additional display 94a is disposed somewhat to the right of the operator's position, as would be the case with the platform being simulated. Finally, gunnery related control elements 94b are also carried by the sled 92.

In accordance with the above-described modular approach, the system 90 incorporates a single kit for purposes of personalizing the sled 92. It will be understood that a plurality of sleds, such as the sleds 92 could be linked together to provide three crewstations for a land vehicle such as a tank. In addition to providing the appropriate displays and vehicle interactions, in such an arrangement the crew members would be in communication with one another as would be the case in the subject platform.

With reference to FIG. 1A, a configuration file for a particular platform to be simulated includes a plurality of object oriented segments, such as segments 18, which are independently executable. Those segments which implement elements of a platform class may be interchangeable. For example, the vehicle dynamic segment or the weapon segment for one type of platform can be replaced by corresponding segments from another platform. Similarly, the manager and environmental segments might also be interchangeable between platforms.

The individual segments distribute messages throughout the virtual network 16a which is implemented by CSL 16. As noted above, the CSL 16 provides various types of services to application segments such as application generic service calls. The services calls access the operating system, the interprocessor communication system, shared resources and also provide tasks scheduling.

The process of creating an executable control program for carrying out a simulation of a selected platform first requires that a configuration file be created. Either a new file can be created or an existing file can be edited or modified using the configuration file editor via the associated graphical user's interface, main window of which is illustrated in FIG. 1C.

The configuration file specifies the segments and interconnecting messages which ultimately carry out the control process leading to behavior which simulates the selected platform. A configuration file includes a manager segment. The manager segment issues a loud configuration call. The configuration file is then read in the segment executable so called. The called segments in turn issue enter configuration calls to register with the CSL 16. They then initiate various generic procedure calls to access message data. When the segments are all initialized, the simulation process can begin.

The tasks of the various segments are synchronized on either clock pulses and/or message events.

Each of the messages is in effect a multiple bit bus for registered segments associated with that message. Segments which write or publish to the bus or segments which read or subscribe to the bus ire registered segments.

Figure 10:
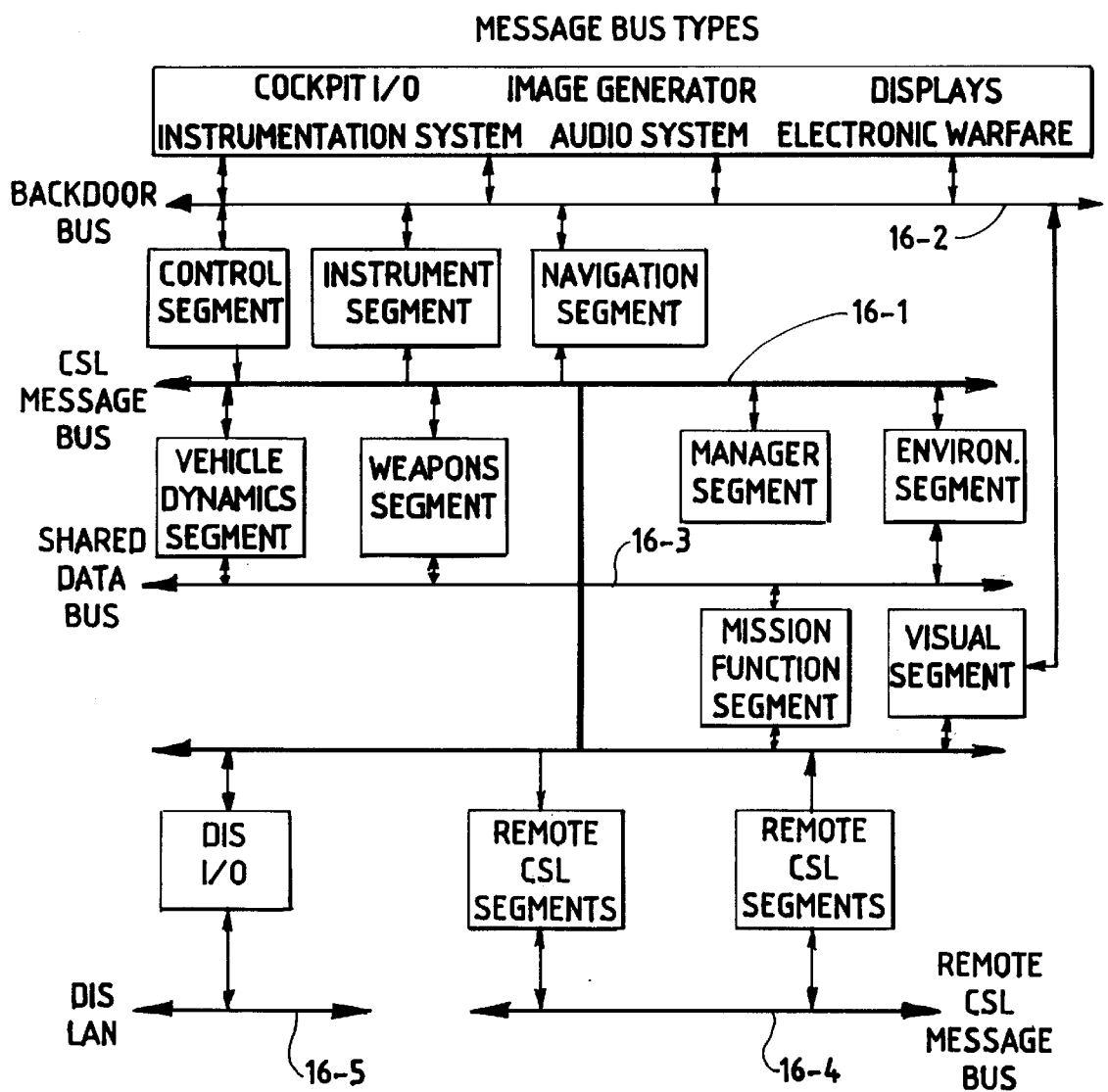
FIG. 10 is a block diagram illustrating types of message buses.

The system 10 supports several different types of message buses as illustrated in FIG. 10. A CSL message bus 16-1 provides intersegment communication within a host processor 12. A group of buses which are associated with input output devices on the sled 30 indicated generally at 16-2, which can be implemented as either RS232 serial ports, Ethernet ports or other types of input output communications paths are used for coupling hardware on the sled 30 to the respective hardware related segments. An internal shared data bus 16-3 is implemented as an unprotected and unbuffered memory.

Communication to other processors on the virtual network 16a can be implemented using remote message buses 16-4. To the extent that the system is coupled to a DIS simulation network, that network can be accessed via an external bus 16-5.

Segment types include object module segments which are application level segments which provide or hold data pertaining to functional characteristics of a selected vehicle.

These include vehicle dynamic segments, vehicle propulsion segments, weapons segments, an environmental segment and a manager segment. Support class segments are tho:se which provide data to the object module segments and include the mission function segment and the visual segment.

The lower level hardware interface segments are characterized by having back door buses which provide access to hardware on the sled 30 which might be through the image generator 20, the instrumentation display computer 22 or the electronics interface 24. Finally, the network interface segments facilitate communications between remote processors such as 12-1, 12-2 . . . 12-n or a DIS network.

Messages, which are areas of data which are written to and read by segments have a number of parameters. Each message has a name associated therewith. The message name is used in CSL calls to distinguish between different messages.

The size of each message is specified as a number of bytes required for a buffer to hold single message. A buffer factor parameter defines how many instances of a particular message can be stored or saved at one time. A protect flag parameter controls message access. Read/write access to a message can be enabled or disabled using this parameter. An X position parameter and a Y position parameter are used by the configuration editor graphical user interface to specify the X and Y positions of a given message on the screen.

Segments have associated therewith at plurality of parameters. Each segment is named. The segment name is used by CSL calls to distinguish between different segments used in a given simulation. A host parameter specifies which processor or processors the segment should run on. In the case of a manager segment, in normal operation that segment would be executed on all hosts used in a given simulation process.

A particular processor can be specified to which a given segment will be associated. Absent binding a segment to a processor, CSL 16 and the operating system may move a particular segment to a different host for execution. A path parameter specifies a UNIX path for the segment executable or script file that will run the segment executable. A priority parameter controls the priority that the segment will receive relative to other processors or segments being run on the host. A lock parameter makes it possible to lock a segment's text and data area thereby making it immune to routine swapping by the operating system. A list of message names must be provided along with the type of access to indicate those messages that the segment needs access to. Finally, X and Y position parameters for the configuration editor graphical user interface must also be specified.

The defined segments and messages make up a configuration file specifying characteristics of a simulation for a selected platform. A configuration file can be implemented as a text file. As described subsequently, and as illustrated in FIG. 1C, a configuration file can be edited using a configuration file editor having a graphical user's interface. An exemplary configuration file is attached hereto as Exhibit A.

Figure 11:
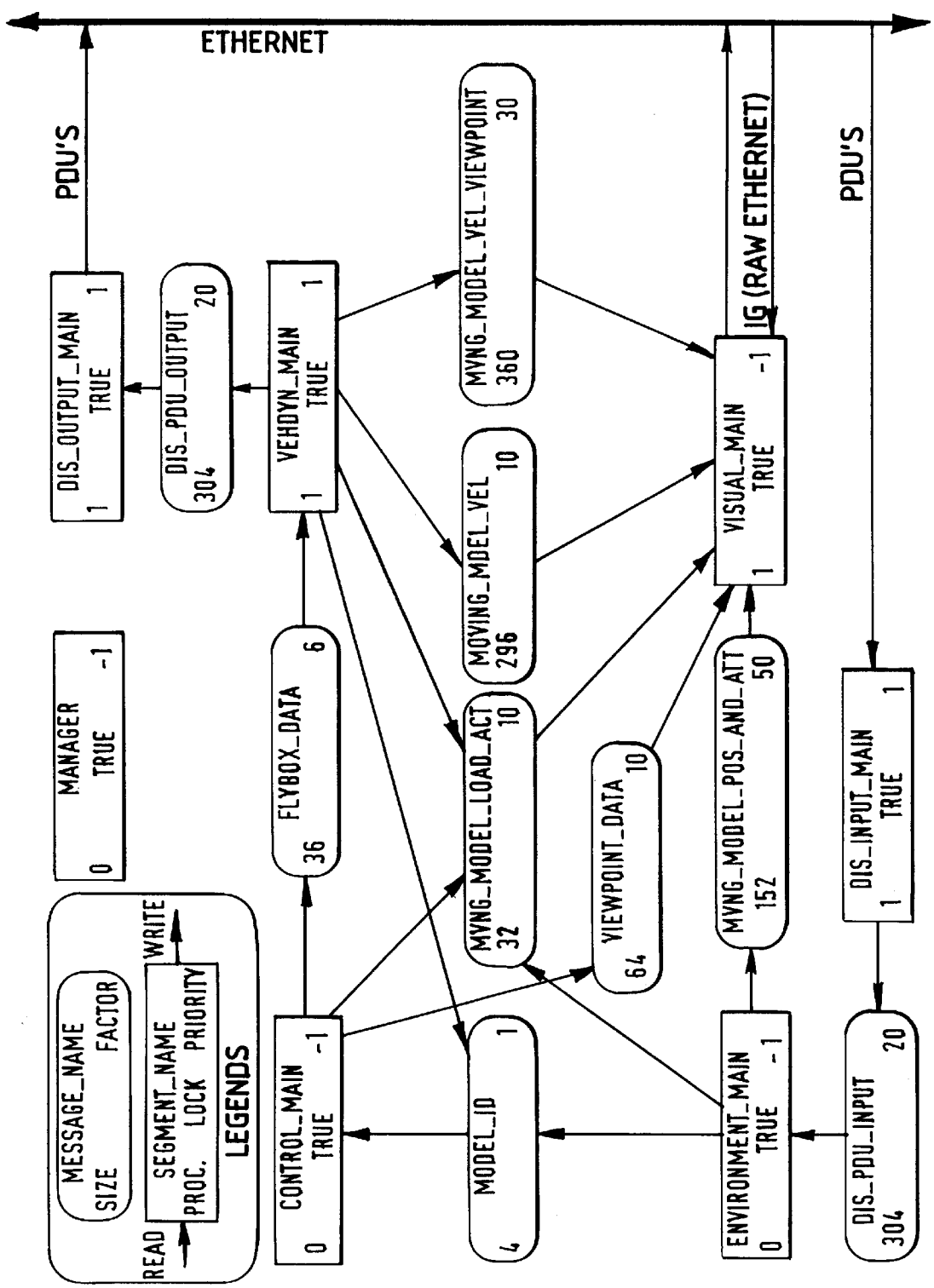
FIG. 11 is a graphical representation of the configuration file of Exhibit A.

Configuration files specify in effect what is a two dimensional graphical representation or functional flow diagram of the simulation process. FIG. 11 illustrates, graphically in a two dimensional formation, the configuration file attached hereto as Attachment A. In FIG. 11, segments are illustrated as rectangles. Messages, which provide communications between segments are indicated within somewhat oval shaped symbol. The graphical representation of the configuration file of Attachment A is illustrated in FIG. 11, lends itself directly to graphically based editing using a configuration editor module.

Editing can take place via the instructor's counsel. The editing process makes it possible to change the characteristics or the behavior of the platform being simulated between simulation runs simply by carrying out an interactive editing process. In this process, for example, vehicle or platform dynamics can be modified, weaponry can be altered or propulsion systems can be changed.

One of the advantages of using the graphical editing process provided by the system 10 is for prototyping. A new heretofore unbuilt platform can be specified in a configuration file. An appropriate kit or kits can be created and mounted on one or more of the sleds 30 for the purpose of simulating the operation and behavior of the new platform.

Characteristics of the platform can be modified using the configuration file and its graphical user's interface in between simulation runs to vary parameters of the proposed platform. For example, the platforms control characteristics, is propulsion system, or its dynamics can be modified in an attempt to achieve an optimal combination of characteristics prior to ever attempting to build the respective vehicle.

FIG. 1C illustrates a main window display of a particular configuration file as presented to an instructor or a user by the configuration file editor. Segments again are indicated in rectangular boxes. Across the top of the display is a configuration file type selection window 102. A user can select a particular type of configuration file by clicking on the selected type of platform. Additionally, six menus are specified at a region 104.

Selecting the file menu presents the following options: "open" opens a file system browser so as to select and open an existing configuration file; "new" displays a prompt for a new file name and opens a new configuration file with that new; "save" saves the current configuration file under the name assigned to it; "save as" will provide a prompt for a n-w file name and save the current configuration file under that name; "close" closes the currently open file and prompt the user to save if any changes were made in the file; "quit" ends the configuration file editor.

The main window also displays the current segments and messages in the selected configuration file, along with their connectivity, in a region generally indicated at 106.

For example purposes, the configuration file illustrated in FIG. 1C is that of a vehicle corresponding to a tank. As will be described subsequently, using the configuration editor, the characteristics of the vehicle illustrated in FIG. 1C can be modified or revised. The revised segments can then be recompiled. Subsequently the compiled segments corresponding to the revised vehicle can then be executed, in combination with a sled, such as a sled 30, which has been modified with a tank kit to correspond to one of the crew positions of the selected tank.

A user can modify the interconnected graphically displayed configuration file. Either segments or messages can be modified or edited.

Modification or editing is carried out by clicking on a segment label or message with a selected one of the buttons on a mouse for example, such as the right button. Other selected keys could be used if preferred. Both properties and parameters of messages can be viewed on the screen or edited. The property characteristics, parameter characteristics, or processor attributes of segments can also be modified or viewed. In this regard, FIG. 1D illustrates the dynamics segment for a tank, illustrated in FIG. 1C, opened for modification. As illustrated in FIG, 1D, the segment is presented in block diagram form in a way that a designer or an instructor would be able to carry out graphical revisions to or modifications of the segment. Each of the blocks illustrated in FIG. 1D could be called up individually and modified as required so as to adjust the dynamics of the tank.

In yet another form of editing, a dynamics segment for a different model tank could be imported into the configuration file illustrated in FIG. 1C from another, prestored, tank configuration file in the system. This makes it possible to quickly move model object segments from one platform to another model of the same general type of platform for comparison and study purposes.

When the user or operator is finished modifying the segment parameters of FIG. 1D, the segment can be saved. Any other segment can be revised or modified accordingly. Hence, the simulation algorithm or methodology can be revised in between runs to take into account new vehicle characteristics to be explored or new or different functionality to be added to a known vehicle.

If the edit menu is selected from the main window, FIG. 1C, a variety of editing functions can be carried out. A connect option makes it possible to make a connection between a selected message and a selected read or write port or box of a segment. A delete function will delete all selected objects segments messages or connection lines. An add segment capability presents a window to enter the properties of a new segment and then display the segment box on the main window. Once displayed the new segment can be positioned appropriately. Subsequently, messages can be added by an add message feature. The user will be presented with a window for entering the properties of a new message. The message logo will be displayed on the window and can be moved to an appropriate position linking segments. Other editing capabilities as would be known and understood to those of skill in the art can be provided.

The view member makes it possible to access model information, change the size of the main window to adjust the amount of marginal white space and provide a monitor window which will provide an estimate usage summary.

The options menu provides an ability to select a processor upon which a given segment is to run. The print menu provides an ability to print various items including segments, messages, con activity information as well as host information.

The control menu can be used to run or shut down a simulation.

Configuration files for new or modified vehicles can be created from existing segments and configuration files.

Figure 12:
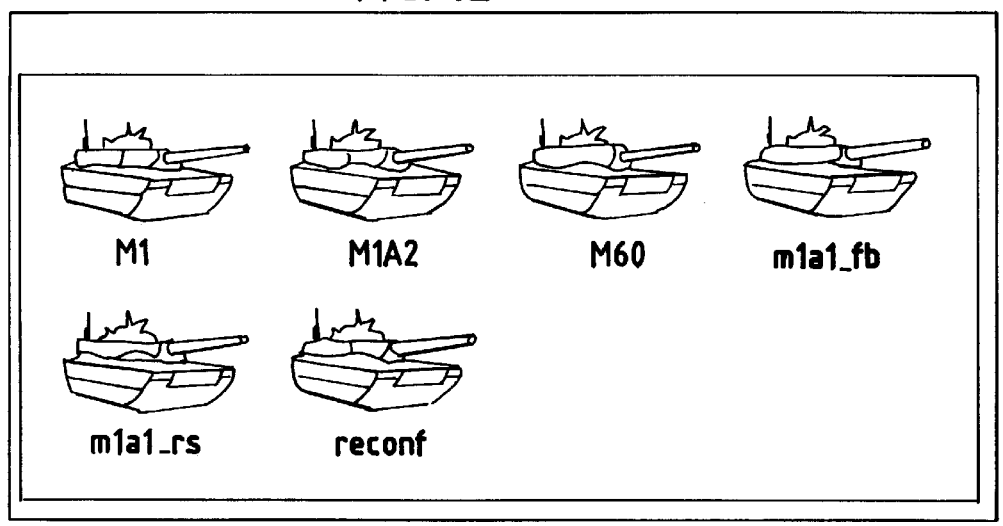
FIG. 12 is a window illustrating graphically various types of configuration files available for a selected class vehicle.

For example, if the open feature is selected from the file member, a tool bar 102 will be displayed illustrating a configuration file types present in the system. Each of the illustrated symbols represent working configuration files that are stored for recall. If for example from the tool bar 102 the tank icon is selected, a supplemental window will appear, see FIG. 12, which presents icons representing those configuration files for vehicles that correspond to the selected type of vehicle. The configuration file for this vehicle will then be loaded into the main window 106 as in FIG. 1C.

Figure 13:
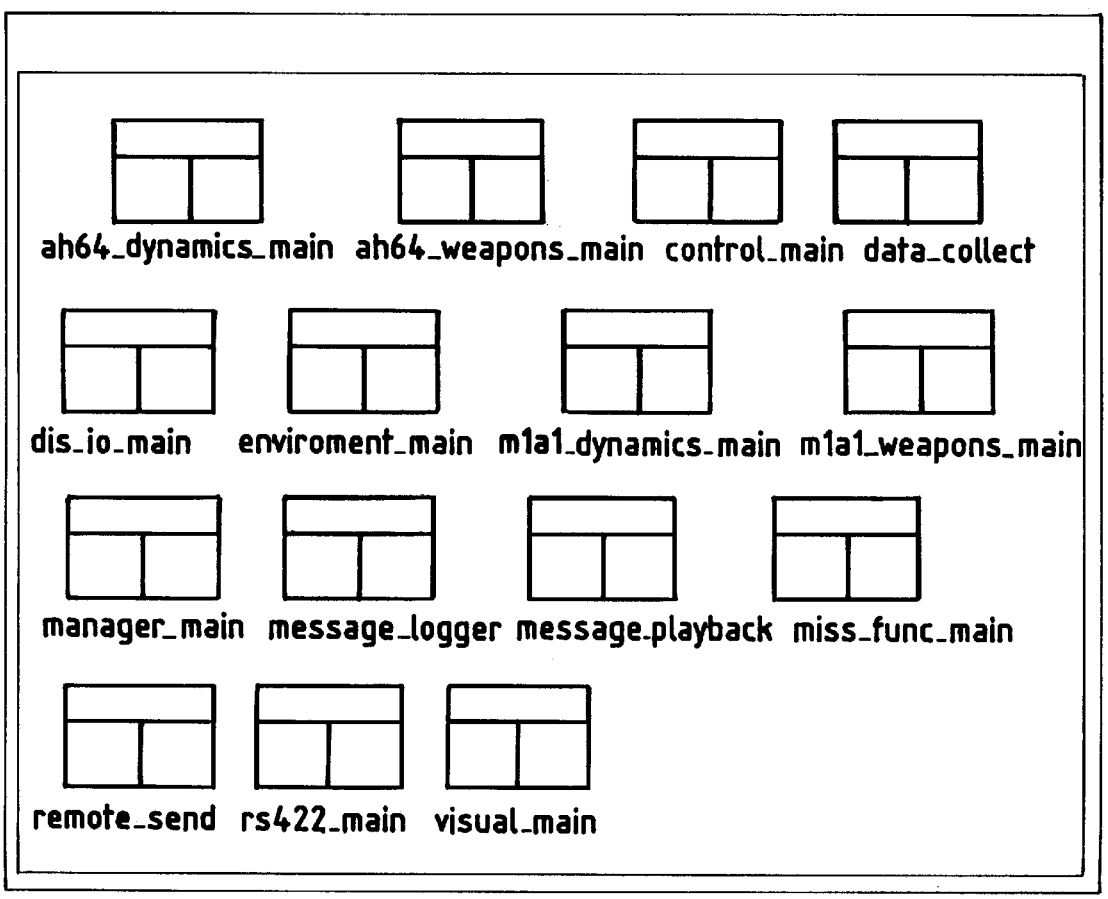
FIG. 13 is a window illustrating various types of selectable segment icons.

Additional prestored segments can be added to the configuration file being displayed by selecting the "segment" icon which in turn will display a window as in FIG. 13. Segments from the window in FIG. 13 can then be dragged into the main window, FIG. 1C and message connections can be made thereto as appropriate. In addition, the newly added segment can be revised or edited as described above.

Subsequently, the configuration file can be processed and compiled into executable form and the simulation executed.

It will be understood that the various replaceable modules, such as the modules 46a and 46b could be implemented as hard wired interconnections of various electro-mechanical and/or electronic elements. Alternately, it will be understood, that one or more of those modules could include a programmed processor coupled to associated control elements such as switches or dials as well as instrument readouts, or simulated readouts, for the purpose of implementing the desired function of that particular module. The local processor in the module can be driven by locally prestored instructions or data. Alternately, the host 12 could transfer some or all of the instructions and data via the electronic interface 24 to the respective local processor for execution. Similarly, that processor can transfer data back to the host 12 for analysis and to respond to actions of the various crewmembers.

Attachment B provides additional information concerning the structure and use of segment and message elements as described previously.

From the foregoing, it will be observed that numerous modifications and variations can be effected without departing from the true spirit and scope of the novel concept of the present invention. It is to be understood that no limitation with respect to the specific embodiment illustrated herein is intended or should be inferred. The disclosure is intended to cover, by the appended claims, all such modifications as fall within the scope of the claims.

What is claimed is:

1. A reconfigurable simulator comprising:

at least one base for configuring a platform to be simulated;

a control unit coupled to the base;

a plurality of sets of hardware modules, wherein each set is associated with a selected platform and wherein members of a selected set are removably engageable with the base, wherein when a selected set is so engaged, the modules present a simulation environment corresponding to the respective platform to a user and wherein the control unit includes a storage medium wherein a plurality of software based control modules is stored and accessible by the control unit wherein some members of the selected set of hardware modules are adapted to interact with respective ones of the control modules thereby enabling the control unit to present to a user a plurality of different simulation experiences as the platform moves in a simulated environment and wherein the control unit includes an icon driven configuration editor for modifying characteristics of the platform.

2. A simulator as in claim 1 wherein the control unit includes a plurality of graphical display system control modules wherein each member of the plurality is associated with and adapted to drive a respective output display generator for real-time presentation of a selected simulated environment adjacent to the base and wherein a generator can be selected in accordance with a desired degree of simulation fidelity.

3. A simulator as in claim 2 wherein the control unit includes circuitry and instrument displays for real-time presentation of instrument outputs for the platform as the platform traverses the selected environment.

4. A reconfigurable simulator comprising:

a base;

a control unit coupled to the base;

a plurality of hardware modules, removably engageable with the base, wherein the modules present a differing simulation environment corresponding to a selected platform to a user and wherein the control unit includes a storage medium wherein a plurality of software based control modules is stored and accessible by the control unit wherein some members of the plurality of hardware modules are adapted to interact with respective ones of the control modules thereby enabling the control unit to present to a user a plurality of different simulation experiences as the platform moves in a simulated environment; and wherein some of the control modules correspond to different platforms and including at least one mechanical template corresponding to a plurality of different display devices for the respective platform, wherein platform display devices are simulated by a selected control module and presented to the user aligned with openings in the template thereby providing selected instruments as would be seen by a user in the platform.

5. A simulator as in claim 1 which includes a second base, coupled to the control unit wherein the two bases together represent a control area of a single platform to be simulated, wherein the base has one plurality of hardware modules from a respective set coupled thereto and the second base has a second plurality of hardware modules coupled thereto wherein the first and second pluralities of modules are from different sets and when coupled to a respective base simulate a single platform having at least two operators.

6. A simulator as in claim 4 which includes a removable, platform specific, bezel which overlies, at least in part, the template.

7. A simulator as in claim 1, which includes a second set of hardware modules, removably engageable with the base wherein the second set of modules, when so engaged, presents a second simulation environment corresponding to a second, different platform.

8. A simulator as in claim 6 which includes a second template.

9. A simulator as in claim 6 which includes a second bezel.

10. A reconfigurable simulator system comprising:
at least two, substantially identical, manually operable vehicle modules each having a plurality of instrument module receiving ports;
first and second pluralities of interchangeable instrument modules wherein the members of the pluralities correspond to instruments and control elements for a vehicle in a class which includes an airborne vehicle, a land vehicle, and a waterborne vehicle wherein the members of the two pluralities are removably received in respective module receiving ports so as to configure both of the control modules to visually correspond to the interior appearance of the selected vehicle with at least some of the instrument modules carrying manually operable control elements corresponding to those in the selected vehicle and wherein the vehicle modules can be arranged relative to one another to correspond to the physical layout of the selected vehicle;
a programmable control unit coupled to the instrument module receiving ports wherein the control unit includes circuits for storage of instructions for simulating in real-time, at least in part, the vehicles from the class.

11. A system as in claim 10 wherein each module includes a vehicle display unit for displaying thereon simulated instruments of a type associated with a selected vehicle.

12. A system as in claim 11 wherein the control unit includes instructions enabling a system control person to modify characteristics of the selected vehicle prior to and during a simulation.

13. A system as in claim 11 wherein the control unit includes instructions enabling a system control person to establish mission characteristics selected from a class which includes geography, weather, location and arrangement of other vehicles in a selected region of the geography, foliage and lighting.

14. A system as in claim 10 which includes a common control console removably coupled to the control unit, and positioned between spaced apart vehicle modules.

15. A system as in claim 13 which includes a plurality of out the window display units, coupled to the control unit and configurable in accordance with characteristics of the selected vehicle wherein the control unit includes further instructions for the visual, real time, presentation of exterior displays for a vehicle operator in at least one of the modules in accordance with the selected mission characteristics.

16. A system as in claim 10 wherein pluralities of instructions for simulating an airborne vehicle, a land vehicle and a waterborne vehicle are simultaneously stored in the storage circuitry.

17. A system as in claim 10 wherein the vehicle modules include structures for removably receiving vehicle directing elements selected from a class which includes an airborne vehicle control stick, a land vehicle steering element, and a waterborne vehicle steering element.

18. A system as in claim 11 wherein the vehicle display units include flat panel displays which are covered, in part, by a vehicle template having instrument openings corresponding to those of the vehicle being simulated.

19. A system as in claim 18 wherein the template is covered in part by a removable, vehicle specific bezel.

20. A reconfigurable simulator system comprising:
a plurality of platform personality kits; and
a modular base adapted to receive each member of the plurality thereby configuring the system in accordance with the platforms associated with the respective kits wherein each of the kits when mounted on the base presents to a user the appearance of the respective platform and provides at least some of the manually operable features of the platform.

21. A system as in claim 20 wherein at least some of the kits include perforated, instrument location defining templates.

22. A system as in claim 21 wherein at least some of the kits include bezels of a type associated with the respective platform.

23. A system as in claim 20 which includes a programmable control unit and executable segment organized software modules which, taken as a group, model the behavior of a selected one of the platform.

24. A system as in claim 23 wherein some of the segments of the group are interconnected by message elements and wherein the segments and messages are stored in a configuration file associated with the respective platform.

25. A system as in claim 24 which includes a module for editing the configuration file.

26. A system as in claim 25 wherein the editing module includes instructions for presenting an editable, graphical representation of the configuration file on a display.

27. A system as in claim 26 wherein the editing module includes instructions for modifying at least some of the segments of the configuration file to produce a modified version of the respective platform.

28. A method of simulating a platform comprising:

specifying platform characteristics including specifying platform propulsion characteristics, platform dynamic characteristics, platform environmental sensing characteristics;

creating a configuration file including interconnected modular segments corresponding to the specified characteristics;

converting the interconnected segments to executable, software modules;

providing a frame corresponding to a single crewstation of the platform;

coupling to the frame a window display device intended to provide a display of an adjacent simulated terrain;

coupling to the frame an instrument display for displaying a plurality of simulated instruments arranged in a predetermined fashion;

covering the instrument display, at least in part with a template having a plurality of openings arranged to be in register with the plurality of simulated instruments, thereby providing a simulated instrument panel;

coupling the executable modules to the displays; and initiating execution of the modules.

29. A method as in claim 28 wherein the creating step includes adding to the configuration file a previously created segment from a configuration file for a different simulatable platform.

30. A method as in claim 28 which includes in the creating step, generating a graphical display of the configuration file.

31. A method as in claim 30 wherein the created graphical, configuration display is in the form of a flow diagram.

32. A method as in claim 30 which includes adding a new segment to the graphical display and interconnecting the new segment with at least one segment already present in the configuration file thereby creating a modified configuration file.

33. A method as in claim 32 which includes compiling the new segment to create an executable module.

34. A method as in claim 29 which includes editing the previously created segment to form an edited segment.

35. A method as in claim 34 which includes recompiling the edited segment.

36. A multi-level system for control of a hardware unit that can be used as a prototyping tool for new and revised platforms, the system comprising:

an operating system for controlling the functioning of at least one programmable processor and selected processor related input/output devices;

a services element which interacts with the operating system to provide an extended group of services to executable object like, application segments;

a plurality of application segments which includes at least a platform dynamics segment, a platform control segment, a visual segment and a manager segment; and, including a configuration file which defines interconnectivity between application segments.

37. A system as in claim 36 which includes a plurality of segments adapted to communicate with selected devices on the hardware unit through respective interface modules apart from the services element.

38. A system as in claim 37 wherein selected of the application segments communicate using a services element message bus.

39. A system as in claim 36 which includes a graphical editor for modification of application segments.

40. A method of reconfiguring a simulator from a first platform to a second platform wherein the simulator has at least a single crewstation frame with a set of personality modules compiled thereto which are associated with the first platform and a set of software modules also associated with the first platform, the method comprising:

replacing the set of personality modules with a second set of modules associated with the second platform;

replacing at least some of the software modules with a second set of modules associated with the second platform.

41. A method as in claim 40 which includes initiating execution of the second set of modules to commence simulation of the second platform.

42. A method as in claim 41 wherein the second set of modules includes a data file which specifies characteristics of the second platform and wherein the data file is modifiable to alter characteristics of the second platform.

43. A method as in claim 40 which includes, in at least one member of the second set of modules, providing a set of pre-stored executable instructions to control the functioning of at least one member.

44. A method as in claim 43 which includes transferring the instructions to the one member for execution.

45. A method of reconfiguring a platform simulator from a first platform to a second comprising:

selecting a set of software modules which, when executed in combination with a hardware unit, representative at least in part of the second platform, provide a simulation thereof;

transmitting information to an element on the unit thereby causing that unit to emulate at least in part, a corresponding unit of the second platform.

46. A method as in claim 45 including removing at least one control module associated with the first platform from the hardware unit and replacing it with a hardware module associated with the second platform.

47. A method as in claim 46 which includes providing executable instructions to the hardware module associated with the second platform.

48. A simulator as in claim 1 wherein some of the sets include a mechanical template removably supported by the base and corresponding to a plurality of different display devices for the respective platform, wherein platform display devices are simulated by a selected control module and presented to the user aligned with openings in the template thereby providing selected instruments as would be seen by a user in the platform.

* * * * *